(12) United States Patent
Koike

(10) Patent No.: US 6,697,234 B2
(45) Date of Patent: Feb. 24, 2004

(54) THIN-FILM MAGNETIC HEAD HAVING A SHIELDING LAYER COVERED BY A HIGH-MELTING POINT LAYER ON THE MAGNETORESISTIVE ELEMENT SIDE

(75) Inventor: Fumihito Koike, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/568,372

(22) Filed: May 10, 2000

(65) Prior Publication Data

US 2003/0058584 A1 Mar. 27, 2003

(30) Foreign Application Priority Data

May 11, 1999 (JP) .......................................... 11-130633

(51) Int. Cl.[7] ................................................ G11B 5/39
(52) U.S. Cl. ...................................... 360/319; 360/320
(58) Field of Search ................................. 360/319, 320

(56) References Cited

U.S. PATENT DOCUMENTS

| 5,696,656 | A | * | 12/1997 | Gill et al. | |
| 5,751,522 | A | | 5/1998 | Yamada et al. | |
| 5,818,684 | A | * | 10/1998 | Iwasaki et al. | |
| 5,828,529 | A | | 10/1998 | Gill | |
| 5,917,681 | A | * | 6/1999 | Okada et al. | |
| 6,169,646 | B1 | * | 1/2001 | Macken et al. | 360/319 |
| 6,188,549 | B1 | * | 2/2001 | Wiitala | 360/320 |
| 6,252,749 | B1 | * | 6/2001 | Hayakawa | 360/320 |
| 6,452,761 | B1 | * | 9/2002 | Carey et al. | 360/320 |

FOREIGN PATENT DOCUMENTS

JP      11-39617      2/1999

* cited by examiner

Primary Examiner—Craig A. Renner
(74) Attorney, Agent, or Firm—Brinks Hofer Gilson & Lione

(57) ABSTRACT

A thin-film magnetic head includes a magnetoresistive element, a shielding layer, and an insulating layer disposed between the magnetoresistive element and the shielding layer. The shielding layer is composed of an amorphous material and the surface thereof facing the magnetoresistive element is covered by a crystallization-inhibiting film for inhibiting crystallization of the shielding layer. The crystallization-inhibiting film may have an antioxidizing function for the shielding layer.

7 Claims, 16 Drawing Sheets

THIN-FILM MAGNETIC HEAD HAVING A SHIELDING LAYER COVERED BY A HIGH-MELTING POINT LAYER ON THE MAGNETORESISTIVE ELEMENT SIDE

BACKGROUND OF THE INVENTION

1. Field of the Invention

The present invention relates to a thin-film magnetic head provided with a magnetoresistive (MR) element, and more particularly to a thin-film magnetic head in which a crystallized layer is not formed on the surface of a shielding layer facing a MR element, magnetic properties are not degraded, and the effective gap length can be easily controlled.

2. Description of the Related Art

As thin-film magnetic heads provided with magnetoresistive elements (MR elements), anisotropic magnetoresistive (AMR) heads using an anisotropic magnetoresistance effect and giant magnetoresistive (GMR) heads using the spin-dependent scattering phenomenon of conduction electrons have been known. As an example of the GMR head, a spin-valve head in which a high magnetoresistance effect is exhibited in a small external magnetic field is disclosed in U.S. Pat. No. 5,159,513.

FIG. 19 is a schematic diagram which shows the structure of a conventional AMR head. In the conventional AMR head, an insulating layer 8 as a lower gap layer is formed on a lower shielding layer 7 composed of a magnetic alloy having the crystal structure of Sendust (Fe—Al—Si) or the like. An AMR element 10 is deposited on the insulating layer 8. In the AMR element 10, a nonmagnetic layer 12 is formed on a soft magnetic layer 11, and a ferromagnetic layer (AMR material layer) 13 is further formed on the nonmagnetic layer 12. Magnetic layers 15 are formed at both sides of the AMR element 10, and conductive layers 16 are formed on the magnetic layers 15. Furthermore, an insulating layer 18 as an upper gap layer is formed, and an upper shielding layer 19 is formed thereon.

In the AMR head having the structure described above, in order to prevent a rise in the temperature of the AMR element 10 due to heat generated by a steady-state sensing current, which may vary the electrical resistance of the ferromagnetic layer 13, the upper and lower gap layers 8 and 18 are composed of alumina ($Al_2O_3$), and heat generated by the steady-state sensing current is gradually transmitted through the gap layers 8 and 18 to the shielding layers 7 and 19, and thus the heat is dissipated.

In order to optimally operate such an AMR head, two bias magnetic fields must be applied to the ferromagnetic layer 13 which exhibits an anisotropic magnetoresistance effect.

A first bias magnetic field is used to make a change in the resistance of the ferromagnetic layer 13 linearly responsive to a magnetic flux from a magnetic medium. The first bias magnetic field is applied perpendicular to the surface of the magnetic medium (in the Z direction in FIG. 19) and parallel to the plane of the ferromagnetic layer 13. The first bias magnetic field is usually referred to as a lateral bias. The soft magnetic layer 11 is magnetized in the Z direction by a magnetic field induced by a sensing current that is conducted by conductive layers 16 though the AMR element 10, and a lateral bias is applied to the ferromagnetic layer 13 in the Z direction by the magnetization of the soft magnetic layer 11.

A second magnetic field is usually referred to as a longitudinal bias, and is applied parallel to the magnetic medium and the plane of the ferromagnetic layer 13 (in the X direction in FIG. 19). The longitudinal bias is applied so that Barkhausen noise, which is caused due to many domains formed in the ferromagnetic layer 13, is suppressed, namely, a smooth change in resistance with decreased noise in response to the magnetic flux from the magnetic medium is enabled.

In order to suppress Barkhausen noise, the ferromagnetic layer 13 must be aligned in a single-domain state. There are two known methods for applying the longitudinal bias. In the first method, the magnet layers 15 are disposed at both sides of the ferromagnetic layer 13 and a leakage flux from the magnet layers 15 is used. In the second method, an exchange anisotropic magnetic field produced at the contact interface between an antiferromagnetic layer and a ferromagnetic layer is used.

As a GMR head in which exchange anisotropic magnetic coupling by an antiferromagnetic layer is used, a spin-valve type GMR head shown in FIG. 20 is known.

The GMR head shown in FIG. 20 differs from the AMR head shown in FIG. 19 in a GMR element 20 which is provided instead of the AMR element 10.

The GMR element 20 includes a free ferromagnetic layer 22, a nonmagnetic intermediate layer 23, a pinned ferromagnetic layer 24, and an antiferromagnetic layer 25.

In the structure shown in FIG. 20, the free ferromagnetic layer 22 must be magnetized in the track width direction (in the X direction in FIG. 20) while the free ferromagnetic layer 22 is aligned in a single-domain state by applying a bias in the track width direction by the magnet layers 15, and the pinned ferromagnetic layer 24 must be magnetized in the Z direction in FIG. 20 while the pinned ferromagnetic layer 24 is aligned in a single-domain state by applying a bias in a direction perpendicular to the magnetization direction of the free ferromagnetic layer 22. That is, the magnetization direction of the pinned ferromagnetic layer 24 should not be changed by the magnetic flux from a magnetic medium (in the Z direction in FIG. 20), and the linear responsiveness of the magnetoresistance can be obtained by a change in the magnetization direction of the free ferromagnetic layer 22 within a range of 90±θ° in relation to the magnetization direction of the pinned ferromagnetic layer 24.

A relatively large bias magnetic field is required in order to pin the magnetization of the pinned ferromagnetic layer 24 in the Z direction in FIG. 20, and the larger the better. A bias magnetic field of at least 100 Oe is required in order to overpower a demagnetizing field in the Z direction and to prevent the magnetization direction from being influenced by the magnetic flux from the magnetic medium. As a method for generating the bias magnetic field, in the structure shown in FIG. 20, an exchange anisotropic magnetic field, which is produced by providing the antiferromagnetic layer 25 in contact with the pinned ferromagnetic layer 24, is used.

Accordingly, in the structure shown in FIG. 20, since the magnetization of the pinned ferromagnetic layer 24 is pinned in the Z direction by exchange anisotropic coupling produced by providing the antiferromagnetic layer 25 in contact with the pinned ferromagnetic layer 24, when a fringing magnetic field is applied from a magnetic medium moving in the Y direction, the electrical resistance of the GMR element 20 is changed in response to a change in the magnetization direction of the free ferromagnetic layer 22, and thus the fringing magnetic field from the magnetic medium can be detected by the change in the electrical resistance.

A bias applied to the free ferromagnetic layer 22 secures the linear responsiveness and suppresses Barkhausen noise resulting from the formation of many domains. A similar method to that of the longitudinal bias in the AMR head is employed in the structure shown in FIG. 20. That is, magnetic layers 15 are provided at both sides of the free ferromagnetic layer 22, and a leakage flux from the magnetic layers 15 is used as a bias.

With respect to the conventional thin-film magnetic heads, since the lower shielding layer 7 is composed of a magnetic alloy having the crystal structure of Fe—Al—Si (Sendust), Ni—Fe—Nb, or the like, the surface of the lower shielding layer 7 is uneven. Thereby, if a MR element is formed on the lower shielding layer 7 with the thin lower gap layer 8 having a thickness of approximately 550 angstroms therebetween, unevenness and pin holes may occur in the surface of the MR element. The unevenness and the like occurs in the surface of the MR element because the MR element, which comprises a laminate including thin films, is as thin as 0.03 μm and is easily influenced by the surface roughness of layers below the MR element.

Recently, there is an increased demand for further improving the shielding characteristics of thin-film magnetic heads, and for that purpose, as the material for the upper and lower shielding layers 7 and 18, a material having more sophisticated characteristics than those of Fe—Al—Si (Sendust) or Ni—Fe—Nb must be used.

Accordingly, use of amorphous magnetic alloy films composed of $Co_{87}Zr_4Nb_9$ as the material for shielding layers has been researched, in which excellent shielding characteristics are exhibited and planar surfaces can be obtained.

When a thin-film magnetic head is fabricated, after an amorphous magnetic alloy film composed of $Co_{87}Zr_4Nb_9$ is deposited on a substrate, the lower shielding layer 7 is formed by annealing and photolithography. Next, after exposure to the atmosphere, an $Al_2O_3$ film as the lower gap layer 8 is deposited on the lower shielding layer 7. It has been found that if the lower shielding layer 7 comprises the amorphous magnetic alloy film composed of $Co_{87}Zr_4Nb_9$, while the lower shielding layer 7 and the lower gap layer 8 are formed, an oxide layer of Zr, Nb, etc, is formed on the surface of the lower shielding layer 7 (the surface facing the MR element) and a high Co-concentration layer having a higher Co concentration than that of the rest of the layer is further formed therebelow. When the lower shielding layer 7 has a design thickness of approximately 1 μm, the thicknesses of the oxide layer and the high Co-concentration layer are approximately 30 angstroms and 30 to 100 angstroms, respectively. The observation of the high Co-concentration layer by a high-resolution transmission electron microscope (TEM) has confirmed that a crystallized layer has been formed.

In the thin-film magnetic head having the structure described above, since the lower shielding layer 7 lies adjacent to the MR element with the lower gap layer 8 therebetween, the magnetic properties of the outermost surface of the lower shielding layer 7 are particularly important. If the oxide layer and the crystallized layer are on the surface of the lower shielding layer 7 facing the MR element, the magnetic properties of the surface of the lower shielding layer 7 facing the MR element deteriorate, and the regenerated waveforms and the waveform symmetry (asymmetry) of the thin-film magnetic head may become unstable. If the crystallized layer is on the surface of the lower shielding layer 7 facing the MR element, the surface becomes uneven, and unevenness and pinholes may occur in the surface of the MR element.

The thickness of an insulating layer between the MR element and the lower shielding layer 7 corresponds to a gap length, and the thickness of the lower gap layer 8 is set according to the gap length. However, if the oxide layer and the crystallized layer are included in the lower shielding layer 7, the effective gap length is increased to a length corresponding to the thickness of the lower gap layer 8 plus the thicknesses of the oxide layer and the crystallized layer, resulting in a difficulty in controlling the effective gap length, which is disadvantageous in terms of head design.

SUMMARY OF THE INVENTION

Accordingly, it is an object of the present invention to provide a thin-film magnetic head in which a crystallized layer is not formed on the surface of a shielding layer facing a MR element, magnetic properties are prevented from deteriorating, and the effective gap length can be easily controlled.

In the present invention, a thin-film magnetic head includes a magnetoresistive element, a shielding layer, and an insulating layer disposed between the magnetoresistive element and the shielding layer. The shielding layer is composed of an amorphous material and the surface thereof facing the magnetoresistive element is covered by a crystallization-inhibiting film for inhibiting crystallization of the shielding layer.

In the thin-film magnetic head of the present invention, the crystallization-inhibiting film for the shielding layer is formed on the surface of the amorphous shielding layer facing the magnetoresistive element. After the shielding layer is deposited, the crystallization-inhibiting film is formed on the shielding layer continuously or after short exposure to the atmosphere, and the insulating layer is deposited on the crystallization-inhibiting film. Since the surface of the shielding layer facing the magnetoresistive element is covered by the crystallization-inhibiting film, the shielding layer is not brought into contact with oxygen for a long period of time, and thereby a change in the quality of the shielding layer can be avoided and the formation of a crystallized layer on the surface of the shielding layer facing the magnetoresistive layer can be avoided.

In the thin-film magnetic head of the present invention, preferably, the crystallization-inhibiting film for the shielding layer has an antioxidizing function for the shielding layer. In such a thin-film magnetic head, even if the crystallization-inhibiting film and the insulating layer are deposited in that sequence in a manner similar to that described above, since the surface of the shielding layer facing the magnetoresistive element is covered by the crystallization-inhibiting film having the antioxidizing function, the shielding layer is not brought into contact with oxygen for a long period of time, a change in the quality of the shielding layer can be avoided, the formation of an oxide layer composed of ingredients of the shielding layer on the surface of the shielding layer facing the magnetoresistive element can be inhibited, and the formation of a crystallized layer can be avoided.

Accordingly, in the thin-film magnetic head of the present invention, the formation of a crystallized layer on the surface of the shielding layer facing the magnetoresistive element can be avoided, or the formation of both an oxide layer composed of ingredients of the shielding layer and a crystallized layer can be inhibited. Thereby, the magnetic properties of the surface of the shielding layer facing the magnetoresistive element are prevented from deteriorating, and the stability of regenerated waveforms as well as the stability in the waveform symmetry (asymmetry) can be improved.

Since the crystallized layer is not formed on the surface of the shielding layer facing the magnetoresistive element, the surface facing the magnetoresistive element is planar, and unevenness and pinholes do not occur in the surface of the magnetoresistive element formed on the shielding layer with the insulating layer therebetween, and thus a planar surface can be obtained.

In the present invention, since the formation of the crystallized layer on the surface of the shielding layer facing the magnetoresistive element can be avoided, or the formation of both the oxide layer of ingredients of the shielding layer and the crystallized layer can be inhibited, the effective gap length depends on only the thicknesses of the insulating layer between the magnetoresistive element and the shielding layer and the crystallization-inhibiting film for the shielding layer. Thereby, the effective gap length can be easily controlled by controlling the thicknesses of the insulating layer and the crystallization-inhibiting film. For example, when a high-melting point metal layer is deposited on the surface of the shielding layer facing the magnetoresistive element at a thickness of X angstroms using a high-melting point metal selected from the group consisting of Ta, W, and Hf as the material for the crystallization-inhibiting film for the shielding layer, the thickness of the high-melting point metal layer is reduced by 10 angstroms, and the high-melting point layer at a thickness of X−10 angstroms is formed on the shielding layer, and a metal oxide layer at a thickness of 20 angstroms is formed on the high-melting point metal layer (on the insulating layer side). Thereby, the effective gap length corresponds to the thickness of the insulating layer plus X+10 angstroms. Consequently, when the effective gap length is set at a predetermined length (Y angstroms), by depositing the insulating layer at a preliminarily reduced thickness, i.e., at a thickness of Y−(X+10), the predetermined effective gap length can be obtained, and thus the effective gap length can be easily controlled.

Moreover, if the crystallization-inhibiting film is formed on the shielding layer, since water-cleaning can be employed after the photolithography process, the usage of an organic solvent-based cleaning agent can be reduced.

In the thin-film magnetic head of the present invention, as the material for the crystallization-inhibiting film, at least one material selected from the group consisting of Ta, W, Hf, $Al_2O_3$, $SiO_2$, and $Ta_2O_5$ may be used. Among them, preferably, at least one high-melting point metal selected from the group consisting of Ta, W, and Hf, is used, which forms a strong, thin passivation layer, does not easily diffuse into the shielding layer even in the annealing process and the like, and has a melting point higher than that of the material constituting the insulating layer.

In the thin-film magnetic head using the high-melting point metal as the material for the crystallization-inhibiting film, the shielding layer is deposited and the crystallization-inhibiting film is formed on the shielding layer continuously or after short exposure to the atmosphere, and then the insulating layer is deposited on the crystallization-inhibiting film. Thus, an oxide layer of the metal is formed on the insulating layer side and the surface of the shielding layer facing the magnetoresistive element is covered by the high-melting point metal layer. Since the shielding layer is not brought into contact with oxygen for a long period of time, and the ingredient of the crystallization-inhibiting film does not diffuse into the shielding layer, a change in the quality of the shielding layer can be avoided, and the formation of the oxide layer and the crystallized layer composed of the ingredients of the shielding layer on the surface of the shielding layer facing the magnetoresistive layer can be avoided.

In the magnetic head in which at least one oxide selected from the group consisting of $Al_2O_3$, $SiO_2$, and $Ta_2O_5$ is used as the material for the crystallization-inhibiting film, the shielding layer is deposited and the crystallization-inhibiting film is formed on the shielding layer continuously or after short exposure to the atmosphere, and then the insulating layer is deposited on the crystallization-inhibiting film. Thus, an oxide film (a film containing oxygen) is interposed between the shielding layer and the insulating layer. However, since oxygen in the oxide film is stabilized, the oxygen does not attack the shielding layer, and also since the surface of the shielding layer facing the magnetoresistive element is covered by the stable crystallization-inhibiting film, the shielding layer is not brought into contact with oxygen in air. Thereby, a change in the quality of the shielding layer can be avoided, and the formation of the oxide layer and the crystallized layer composed of the ingredients of the shielding layer on the surface of the shielding layer facing the magnetoresistive element can be avoided.

Moreover, in the thin-film magnetic head of the present invention, the crystallization-inhibiting film may include a high-melting point metal layer formed on the shielding layer side and an oxide layer formed on the insulating layer side. The high-melting point metal layer may be composed of at least one metal selected from the group consisting of Ta, W, and Hf, and the oxide layer may be composed of at least one oxide selected from the group consisting of $Al_2O_3$, $SiO_2$, and $Ta_2O_5$.

In the thin-film magnetic head having such a structure, the shielding layer is deposited and the crystallization-inhibiting film is formed on the shielding layer continuously or after short exposure to the atmosphere, and then the insulating layer is deposited on the crystallization-inhibiting film. Thus, the oxide layer is formed on the insulation layer side and the surface of the shielding layer facing the magnetoresistive element is covered by the high-melting point metal layer. Since the shielding layer is not brought into contact with oxygen for a long period of time and the ingredient of the crystallization-inhibiting film does not diffuse into the shielding layer, a change in the quality of the shielding layer can be avoided and the formation of the oxide layer and the crystallized layer composed of the ingredients of the shielding layer on the surface of the shielding layer facing the magnetoresistive element can be avoided.

Preferably, the thickness of the crystallization-inhibiting film is 20 angstroms or more. If the thickness of the crystallization-inhibiting film is less than 20 angstroms, the effect of inhibiting the formation of a crystallized layer on the surface of the shielding layer facing the magnetoresistive element becomes insufficient.

When the high-melting point metal is used as the material for the crystallization-inhibiting film, the high-melting point metal layer is preferably formed at a thickness of more than 10 angstroms. The reason for this is that, when the shielding layer is deposited and the high-melting point metal layer having a thickness of 10 angstroms or less and the insulating layer are deposited in that sequence on the shielding layer continuously or after short exposure to the atmosphere, the thickness of the high-melting point metal layer is reduced by 10 angstroms, and the oxide layer of the high-melting point metal with a thickness of 20 angstroms is formed. That is, the surface of the shielding layer facing the magnetoresistive element is covered by the oxide layer of the high-melting point metal, and in comparison with the case in which the surface facing the magnetoresistive element is covered by the high-melting point metal layer, the effect of inhibiting the formation of the oxide layer and the crystallized layer composed of the ingredients of the shielding layer on the surface facing the magnetoresistive element is weakened.

Furthermore, in the thin-film magnetic head of the present invention, preferably, the thickness of the crystallization-inhibiting film is one tenth or less of that of the insulating layer. Since the distribution of the thickness of the insulating layer varies by approximately ±10%, if the thickness of the crystallization-inhibiting film adjacent to the insulating layer is within the above range of variation, the gap length is not greatly affected. If the thickness of the crystallization-inhibiting film exceeds the one tenth of the thickness of the insulating layer, the thickness of the insulating layer is reduced by just that much, and the effect of preventing the leakage of the current flowing through the magnetoresistive element is decreased.

In the thin-film magnetic head of the present invention, the distance between the shielding layer and the magnetoresistive element is preferably larger than a thickness corresponding to the thickness of the insulating layer plus 20 angstroms.

If the distance between the shielding layer and the magnetoresistive element is less than a thickness corresponding to the thickness of the insulating layer plus 20 angstroms, the thickness of the crystallization-inhibiting film also becomes less than 20 angstroms. Thereby, the effect of inhibiting the formation of the crystallized layer on the surface of the shielding layer facing the magnetoresistive element becomes insufficient.

DESCRIPTION OF THE PREFERRED EMBODIMENTS

Figure 1:
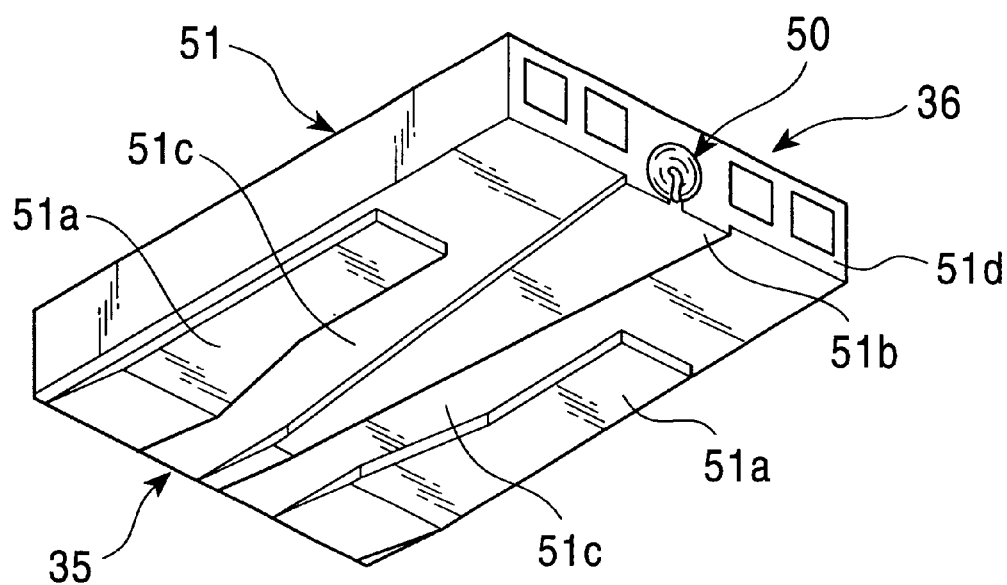
FIG. 1 is a perspective view of a thin-film magnetic head in accordance with a first embodiment of the present invention.

FIGS. 1 to 4 show the structure of a thin-film magnetic head as a first embodiment of the present invention.

The thin-film magnetic head of the first embodiment is a floating-type magnetic head which is mounted in a hard disk drive or the like. In a slider 51 shown in FIG. 1, numeral 35 represents the leading side and numeral 36 represents the trailing side. On the surface of the slider 51 facing a disk, rail-shaped air bearing surfaces (ABS) 51a and 51b and air grooves 51c are formed.

A thin-film magnetic head 50 is provided on an end 51d of the slider 51 at the trailing side.

Figure 2:
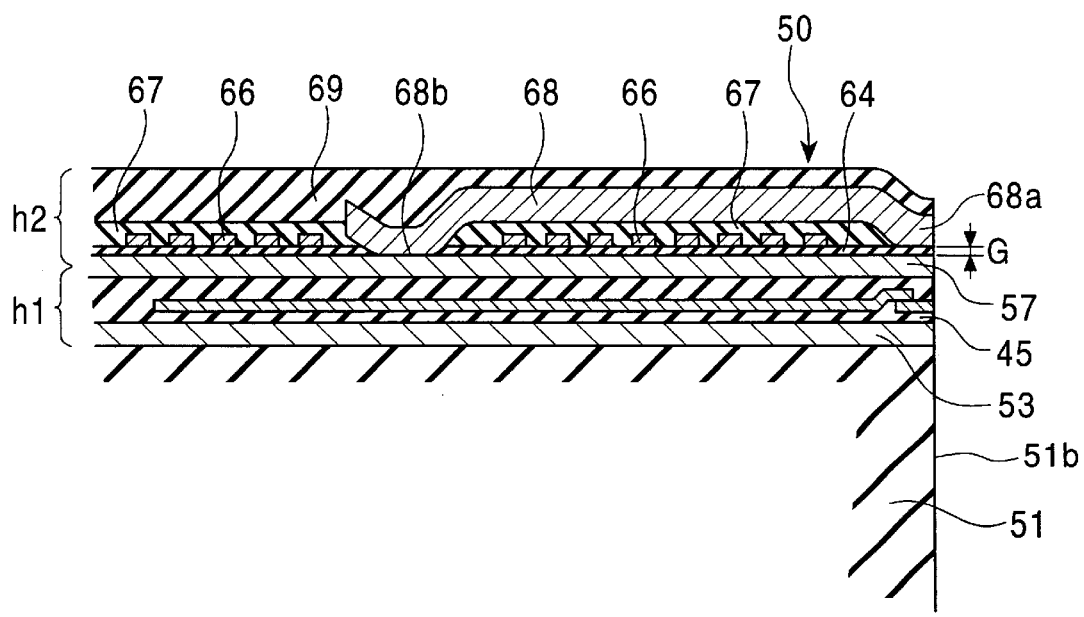
FIG. 2 is a sectional view showing a principal portion of the thin-film magnetic head shown in FIG. 1.
Figure 3:
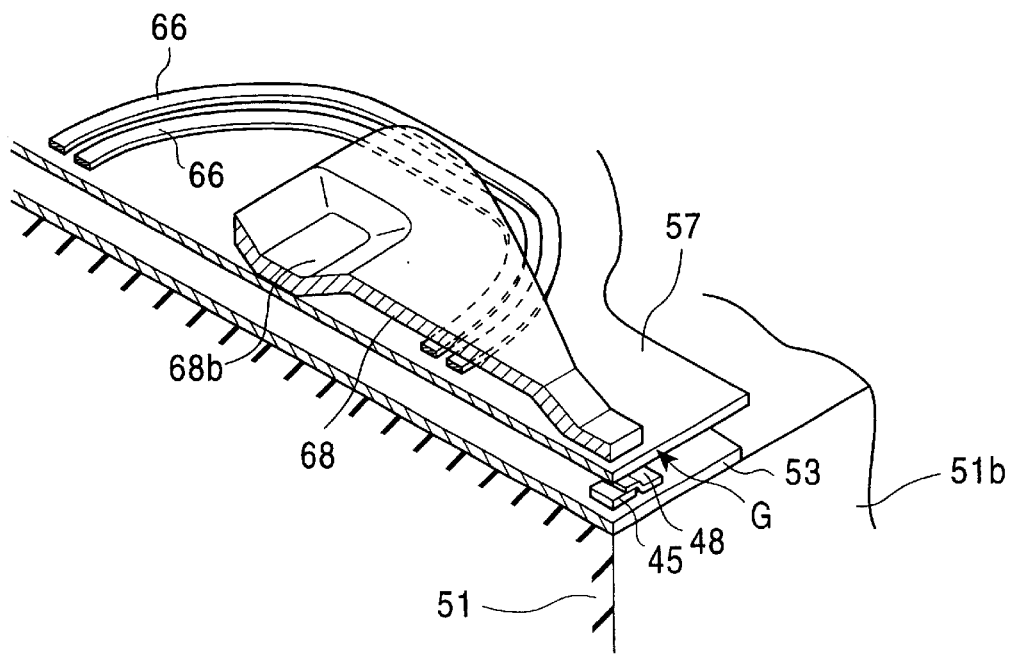
FIG. 3 is a perspective view of a portion of the thin-film magnetic head shown in FIG. 1.

The thin-film magnetic head 50 is a combined magnetic head in which, as shown in FIGS. 2 and 3, a MR head (read head) h1 and an inductive head (write head) h2 are deposited in that sequence at the trailing end 51d of the slider 51.

Figure 4:
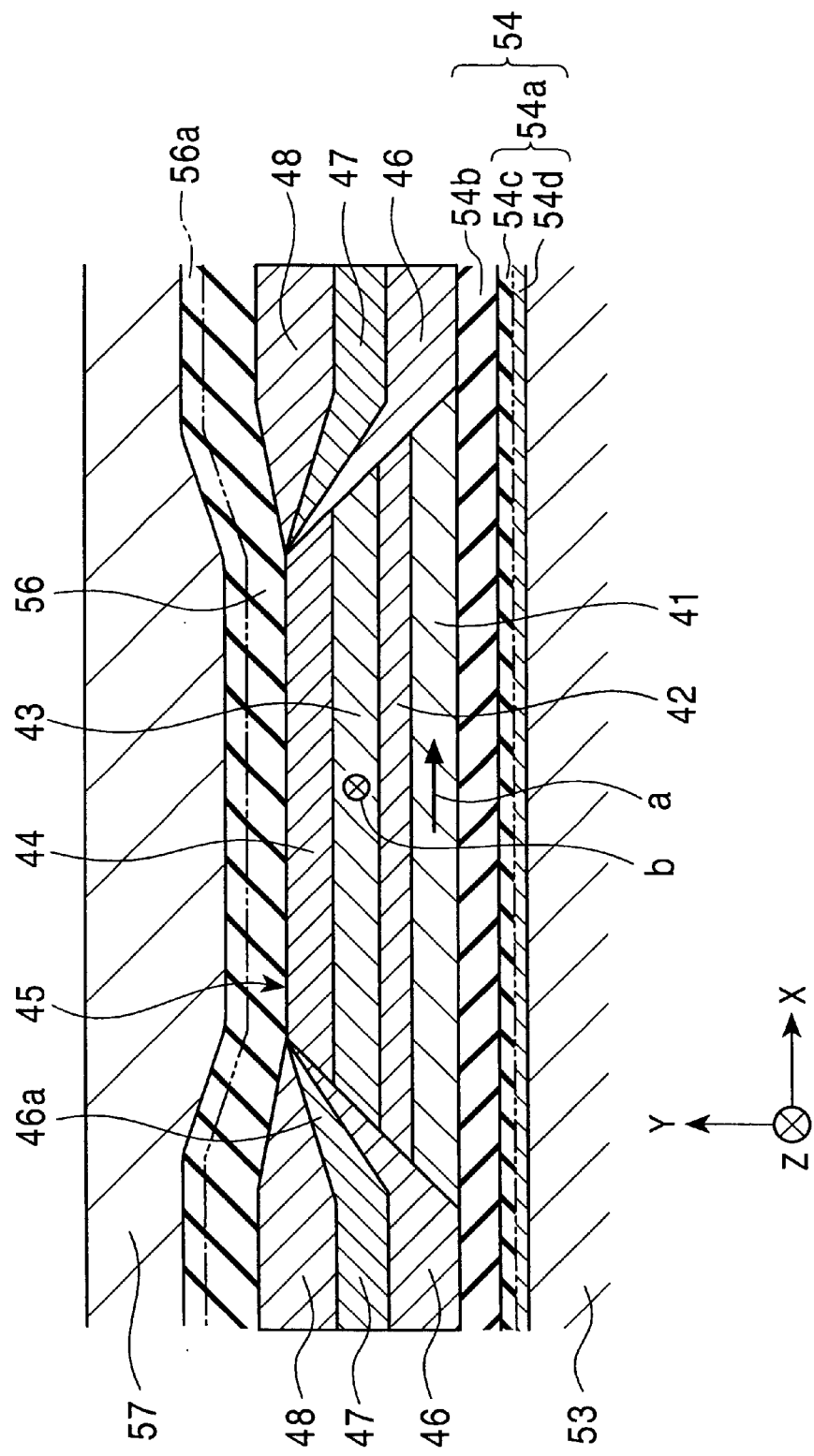
FIG. 4 is a sectional view showing the structure of a MR head provided in the thin-film magnetic head shown in FIG. 1.

The MR head h1 detects a fringing magnetic field from a recording medium, such as a disk, using a magnetoresistance effect and reads magnetic signals. As shown in FIG. 4, in the MR head h1, a lower gap layer 54 is provided on a lower shielding layer 53 formed at the trailing end of the slider 51.

A GMR element 45 as a magnetoresistive element is deposited on the lower gap layer 54. Ferromagnetic layers 46 composed of a Co—Pt alloy or the like are provided at both sides of the GMR element 45, and a conductive underlying layer 47 composed of Ta or the like and an electrode layer 48 composed of Cr or the like are deposited on each ferromagnetic layer 46. The electrode layer 48 applies a sensing current to the GMR element 45. The ferromagnetic layers 46 apply a leakage flux therefrom as a bias to a free ferromagnetic layer 41, which will be described below, so that the linear responsiveness is secured and Barkhausen noise is suppressed.

An upper gap layer 56 is formed on the GMR element 45 and the electrode layers 48, and an upper shielding layer 57 is formed thereon. The upper shielding layer 57 also acts as a lower core layer of the inductive head h2 which is provided thereon.

Each of the lower shielding layer 53 and the upper shielding layer 57 is composed of an amorphous alloy film such as a magnetic alloy comprising $Co_{87}Zr_4Nb_9$.

The lower gap layer 54 includes a crystallization-inhibiting film 54a formed on the surface of the lower shielding layer 53 facing the GMR element 45 and an insulating layer 54b formed thereon.

The upper gap layer 56 is composed of an insulating layer.

The crystallization-inhibiting film 54a of the lower gap layer 54 is formed using at least one material selected from the group consisting of Ta, W, Hf, $Al_2O_3$, $SiO_2$, and $Ta_2O_5$. Among them, preferably, at least one high-melting point metal selected from the group consisting of Ta, W, and Hf, is used, which forms a strong, thin passivation layer, does not easily diffuse into the shielding layer 53 even in the annealing process and the like, and has a melting point higher than that of the material constituting the insulating layer.

When the high-melting point metal is used for the crystallization-inhibiting film 54a, as shown in FIG. 4, an oxide layer 54c of the high-melting point metal is formed on the insulating layer 54b side, and a high-melting point metal layer 54d is formed on the surface of the lower shielding layer 53 facing the GMR element 45. The surface of the lower shielding layer 53 facing the GMR element 45 is covered by the high-melting point metal layer 54d.

When at least one oxide selected from the group consisting of $Al_2O_3$, $SiO_2$, and $Ta_2O_5$ is used as the material for the crystallization-inhibiting film 54a, the crystallization-inhibiting film 54a composed of the oxide is formed between the lower shielding layer 53 and the insulating layer 54b, and the surface facing the GMR element 45 is covered by the crystallization-inhibiting film 54a.

The crystallization film 54a may include a high-melting point metal layer 54d formed on the lower shielding layer 53 side and an oxide layer 54c formed on the insulating layer 54b side. In such a crystallization-inhibiting film 54a, the surface of the lower shielding layer 53 facing the GMR element 45 is covered by the high-melting point metal layer 54d. Herein, the high-melting point metal layer 54d is composed of at least one metal selected from the group consisting of Ta, W and Hf. The oxide layer 54c is composed of at least one oxide selected from the group consisting of $Al_2O_3$, $SiO_2$, and $Ta_2O_5$.

Preferably, the thickness of the crystallization-inhibiting film 54a is 20 angstroms or more. If the thickness of the crystallization-inhibiting film 54a is less than 20 angstroms, the effect of inhibiting the formation of the crystallized layer on the surface of the lower shielding layer 53 facing the MR element 45 becomes insufficient.

When the high-melting point metal is used as the material for the crystallization-inhibiting film 54a, the high-melting point metal layer is preferably formed at a thickness of more than 10 angstroms. The reason for this is that, when the lower shielding layer 53 is deposited and the high-melting point metal layer having a thickness of 10 angstroms or less and the insulating layer 54 are deposited in that sequence on the lower shielding layer 53 continuously or after short exposure to the atmosphere, the surface of the lower shielding layer 53 facing the GMR element 45 is not covered by the high-melting point metal layer, but is covered by the oxide layer comprising the high-melting point metal. In comparison with the case in which the surface is covered by the high-melting point metal layer 54d, the effect of inhibiting the formation of the oxide layer and the crystallized layer composed of the ingredients of the lower shielding layer 53 on the surface facing the GMR element 45 is weakened.

Furthermore, preferably, the thickness of the crystallization-inhibiting film 54a is one tenth or less of that of the insulating layer 54b. Thereby, since the thickness of the crystallization-inhibiting film 54a is within the range of variation in the distribution of the thickness of the insulating layer 54b, the gap length of the lower gap layer 54 is not greatly affected, and also the effect of preventing the leakage of the current flowing through the GMR element 45 is not impaired.

The insulating layer 54b of the lower gap layer 54 and the upper gap layer 56 are composed of a nonmagnetic material, such as $Al_2O_3$ (alumina) so that the leakage of the current flowing through the GMR element 45 is prevented and heat generated by a steady-state sensing current is dissipated.

The insulating layer 54b of the lower gap layer 54 and/or the upper gap layer 56 are preferably composed of an insulating layer having high thermal conductance containing at least Al, N, X, and O. Thereby, heat generated by the steady-state sensing current can be efficiently dissipated, corrosion resistance with respect to strong alkaline solutions and water is improved, and the membrane stress of the gap layer can be minimized. Alternatively, a multilayered structure partially composed of a nonmagnetic material, such as alumina, may be employed. In such a case, the layer composed of the nonmagnetic material, such as alumina, is preferably provided on the exterior of the insulating layer having high thermal conductance because heat generated by the steady-state sensing current can be efficiently dissipated. "X" in the above is at least one element selected from the group consisting of Si, B, Ge, and C. The insulating layer having high thermal conductance has a higher thermal conductivity than that of $Al_2O_3$.

The distance between the lower shielding layer 53 and the GMR element 45, i.e., the gap length of the lower gap layer 54 corresponds to the sum of the thickness of the insulating layer 54b and the thickness of the crystallization-inhibiting film 54a.

The gap length of each of the lower gap layer 54 and the upper gap layer 56 is set at approximately 300 to 1,000 angstroms.

The gap length of the lower gap layer 54 is preferably larger than a thickness corresponding to the thickness of the insulating layer plus 20 angstroms because the satisfactory effect of inhibiting the formation of the crystallized layer on the surface of the lower shielding layer 53 facing the GMR element 45 is obtained.

In the inductive head h2, a gap layer 64 is formed on a lower core layer 57, a planar coil layer 66 spirally patterned is formed thereon, and the coil layer 66 is surrounded by an insulating material layer 67. An upper core layer 68 is formed on the insulating material layer 67, and a tip 68a of the upper core layer 68 is opposed to the lower core layer 57 with a very small gap therebetween at the ABS 51b. A base 68b of the upper core layer 68 is magnetically coupled with the lower core layer 57.

A protective layer 69 composed of alumina or the like is formed on the upper core layer 68.

In the inductive head h2, a recording current is applied to the coil layer 66, and the recording current is applied from the coil layer 66 to the core layers. Magnetic signals are written in a magnetic recording medium, such as a hard disk, by means of a fringing magnetic field from the lower core layer 57 and the tip of the upper core layer 68 at a magnetic gap G.

In the MR head h1, the resistance of the GMR element 45 changes depending on whether or not a very small fringing magnetic field from a recording medium, such as a hard disk, is present, and by reading the resistance change, data recorded in the recording medium are read.

The GMR element 45 includes a laminate that is trapezoidal in section, in which a free ferromagnetic layer 41, a nonmagnetic layer 42, a pinned ferromagnetic layer 43, and an antiferromagnetic layer 44 are deposited.

Each of the ferromagnetic layers 41 and 43 is composed of a ferromagnetic thin film, and specifically, a Ni—Fe alloy, a Co—Fe alloy, a Ni—Co alloy, Co, a Ni—Fe—Co alloy, or the like may be used. The ferromagnetic layer 43 may be composed of a Co layer, and the ferromagnetic layer 41 may be composed of a Ni—Fe alloy layer, a laminate including a Co layer and a Ni—Fe alloy layer, or a laminate including a Co—Fe alloy layer and a Ni—Fe alloy layer. When the two-layer structure including the Co layer and the Ni—Fe alloy layer is employed, preferably, the thinner Co layer is disposed on the nonmagnetic layer 42 side. When the two-layer structure including the Co—Fe alloy layer and the Ni—Fe alloy layer is employed, preferably, the thinner Co—Fe alloy layer is disposed on the nonmagnetic layer 42 side.

In a mechanism for producing the giant magnetoresistance effect in which the nonmagnetic layer 42 is sandwiched between ferromagnetic layers 41 and 43, the spin-dependent scattering effect of conduction electrons is increased at the interface between Co and Cu, and in the structure in which the ferromagnetic layers 41 and 43 are composed of the same material, in comparison with the structure in which the ferromagnetic layers 41 and 43 are composed of different materials, the possibility of causing factors other than spin-dependent scattering of conduction electrons is decreased, resulting in the higher magnetoresistance effect. Accordingly, when the ferromagnetic layer 43 is composed of Co, preferably, the ferromagnetic layer 41 on the nonmagnetic layer 42 side is replaced by a Co layer with a predetermined thickness. Alternatively, even if the Co layer is not distinctly provided, a concentration gradient layer may be formed in the ferromagnetic layer 41, in which an alloy state having the high Co concentration lies on the nonmagnetic layer 42 side and the Co concentration is increased toward the nonmagnetic layer 42.

When the ferromagnetic layers 41 and 43 are composed of Co—Fe alloy layers and the nonmagnetic layer 42 is sandwiched between the ferromagnetic layers 41 and 43, the spin-dependent scattering effect of conduction electrons is increased at the interface between the Co—Fe alloy layer and the Cu layer, and the possibility of causing factors other than the spin-dependent scattering of conduction electrons is decreased, resulting in the higher magnetoresistance effect.

The nonmagnetic layer 42 is composed of a nonmagnetic material, such as Cu, Cr, Au, or Ag, and has a thickness of 20 to 40 angstroms. If the thickness of the nonmagnetic layer 42 is smaller than 20 angstroms, magnetic coupling easily occurs between the ferromagnetic layer 41 and the ferromagnetic layer 43. If the thickness of the nonmagnetic layer 42 is larger than 40 angstroms, the percentage of conduction electrons scattered at the interfaces between the nonmagnetic layer 42 and the ferromagnetic layers 41 and 43 for producing the magnetoresistance effect is decreased, and the magnetoresistance effect is decreased by the shunt effect of the current, which is disadvantageous.

The antiferromagnetic layer 44 is preferably composed of an $X_1$-Mn alloy, where $X_1$ is preferably at least one element selected from the group consisting of Ru, Rh, Ir, Pd, and Pt.

When $X_1$ is a single metallic element, the $X_1$ content is preferably set in a range from 10 to 45 atomic % in the case of Ru, from 10 to 40 atomic % in the case of Rh, from 10 to 40 atomic % in the case of Ir, from 10 to 25 atomic % in the case of Pd, and from 10 to 25 atomic % in the case of Pt.

The Mn-based alloys in the ranges described above have disordered crystal structures. The disordered crystal structures refer to not being ordered crystal structures, such as face-centered tetragonal structures (fct ordered lattice such as CuAu-I structure). That is, the Mn-based alloys used here are not subjected to high-temperature, long-time heating treatment for transforming into ordered crystal structures, such as face-centered tetragonal structures (e.g., CuAu-I structure) after being formed by sputtering or the like. The disordered crystal structures refer to the states as formed by sputtering or the like, followed or not followed by usual annealing treatment.

In the $X_1$—Mn alloy, where $X_1$ is preferably at least one element selected from the group consisting of Ru, Rh, Ir, Pd, and Pt, more preferably, the $X_1$ content is in a range from 37 to 63 atomic %.

The $X_1$—Mn alloy in the range described above has a face-centered cubic lattice in which $X_1$ atoms and Mn atoms are arranged in disordered sequence when formed by sputtering or the like, and an exchange anisotropic magnetic field does not substantially occur at the interface with the ferromagnetic layer. By magnetic annealing treatment, the lattice is transformed into a face-centered tetragonal lattice, and an exchange anisotropic magnetic field ($H_{ex}$) having large unidirectional anisotropy can be produced at the interface with the ferromagnetic layer.

The antiferromagnetic layer 44 may be composed of an $X_1$—Mn-$X_2$ alloy, where $X_1$ is preferably at least one element selected from the group consisting of Ru, Rh, Ir, Pd, and Pt, and $X_2$ is preferably at least one element selected from the group consisting of Au, Ag, Mg, Al, Si, P, Be, B, C, Se, Ti, V, Cr, Fe, Co, Ni, Cu, Zn, Ga, Ge, Y, Zn, Nb, Mo, Hf, Ta, W, Sn, and In. The compositional ratio of $X_1$ to Mn is, in atomic percent, $X_1$: Mn=4:6 to 6:4. The $X_2$ content is in a range from 0.2 to 10 atomic %.

When the antiferromagnetic layer 44 is composed of the $X_1$—Mn—$X_2$ alloy, by performing magnetic annealing treatment after the layer is formed, an exchange anisotropic magnetic field ($H_{ex}$) having large unidirectional anisotropy can also be produced at the interface with the ferromagnetic layer.

The antiferromagnetic layer 44 composed of the $X_1$—Mn alloy or the $X_1$—Mn—$X_2$ alloy can apply an exchange anisotropic magnetic field of unidirectional anisotropy to the interface with the pinned ferromagnetic layer 43 and can pin the magnetic rotation of the ferromagnetic layer 43 toward an external signal magnetic field.

The antiferromagnetic layer 44 composed of the $X_1$—Mn alloy has superior corrosion resistance in comparison with the Fe—Mn alloy, and a variation in exchange anisotropic magnetic field ($H_{ex}$) in relation to a change in temperature is reduced.

In the structure shown in FIG. 4, the free ferromagnetic layer 41 is magnetized in the track width direction (X direction in FIG. 4) while the free ferromagnetic layer 41 is aligned in a single-domain state by applying a bias in the track width direction by the ferromagnetic layers 46. In FIG. 4, an arrow a represents the magnetization direction of the free ferromagnetic layer 41. The magnetization direction of the ferromagnetic layer 43 is pinned in the Z direction by exchange anisotropic coupling produced by providing the antiferromagnetic layer 44 in contact with the pinned ferromagnetic layer 43. In FIG. 4, symbol b represents the magnetization direction of the ferromagnetic layer 43. Consequently, in the structure shown in FIG. 4, when a fringing magnetic field is applied from a magnetic medium moving in the Y direction, since the electrical resistance of the GMR element 45 changes in response+ a change in the magnetization direction of the free ferromagnetic layer 41, the fringing magnetic field from the magnetic medium can be detected by the change in the electrical resistance.

In the magnetic head of the first embodiment, the lower shielding layer 53 composed of the amorphous alloy film comprising $Co_{87}Zr_4Nb_9$ is deposited, and continuously or after short exposure to the atmosphere, the crystallization-inhibiting film 54a, which has the antioxidizing function for the shielding layer and inhibits the crystallization of the shielding layer, is formed, and then the insulating layer is deposited on the crystallization-inhibiting film 54a. Thus the crystallization-inhibiting film 54a is formed on the surface of the lower shielding layer 53 facing the GMR element 45. Since the surface of the lower shielding layer 53 facing the GMR element 45 is covered by the crystallization-inhibiting film 54a, and the lower shielding layer 53 is not brought into contact with oxygen for a long period of time, a change in the quality of the lower shielding layer 53 can be avoided, and the formation of an oxide layer composed of ingredients of the lower shielding layer 53 on the surface of the lower shielding layer facing the GMR element 45 is inhibited. Since a high Co-concentration layer is not formed, the formation of a crystallized layer can be avoided. Therefore, the magnetic properties of the surface of the lower shielding layer 53 facing the GMR element 45 are prevented from deteriorating, and the stability of regenerated waveforms as well as the stability in the waveform symmetry (asymmetry) can be improved.

Since the crystallized layer is not formed on the surface of the lower shielding layer 53 facing the GMR element 45, the surface facing the GMR element 45 is planar, and unevenness and pinholes do not occur in the surface of the GMR element 45 formed thereon with the insulating layer 54b therebetween, and thus a planar surface can be obtained.

In the magnetic head of the first embodiment, since the formation of the oxide layer and the crystallized layer composed of the ingredients of the shielding layer 53 on the surface of the lower shielding layer 53 facing the GMR element 45 can be inhibited, the effective gap length depends on only the thicknesses of the insulating layer 54b and the crystallization-inhibiting film 54a between the GMR element 45 and the lower shielding layer 53. Thereby, the effective gap length can be easily controlled by controlling the thicknesses of the insulating layer 54b and the crystallization-inhibiting film 54a.

Moreover, if the crystallization-inhibiting film 54a is formed on the lower shielding layer 53 (since water-cleaning can be employed after the photolithography process), the usage of an organic solvent-based cleaning agent can be reduced.

Although the surface of the lower shielding layer 53 facing the GMR element 45 is covered by the crystallization-inhibiting film 54a in the magnetic head of the first embodiment, in accordance with the present invention, the surface of the upper shielding layer 57 facing the GMR element 45 may be covered by a crystallization-inhibiting film 56a having the same structure as that of the crystallization-inhibiting film 54a, and thus in addition to the covering of the surface of the lower shielding layer 53 facing the GMR element 45 by the crystallization-inhibiting film 54a, the surface of the upper shielding layer 57 facing the GMR element 45 may be covered by the crystallization-inhibiting film 56a having the same structure as that of the crystallization-inhibiting film 54a.

Next, the structure of a magnetic head as a second embodiment of the present invention will be described.

Figure 5:
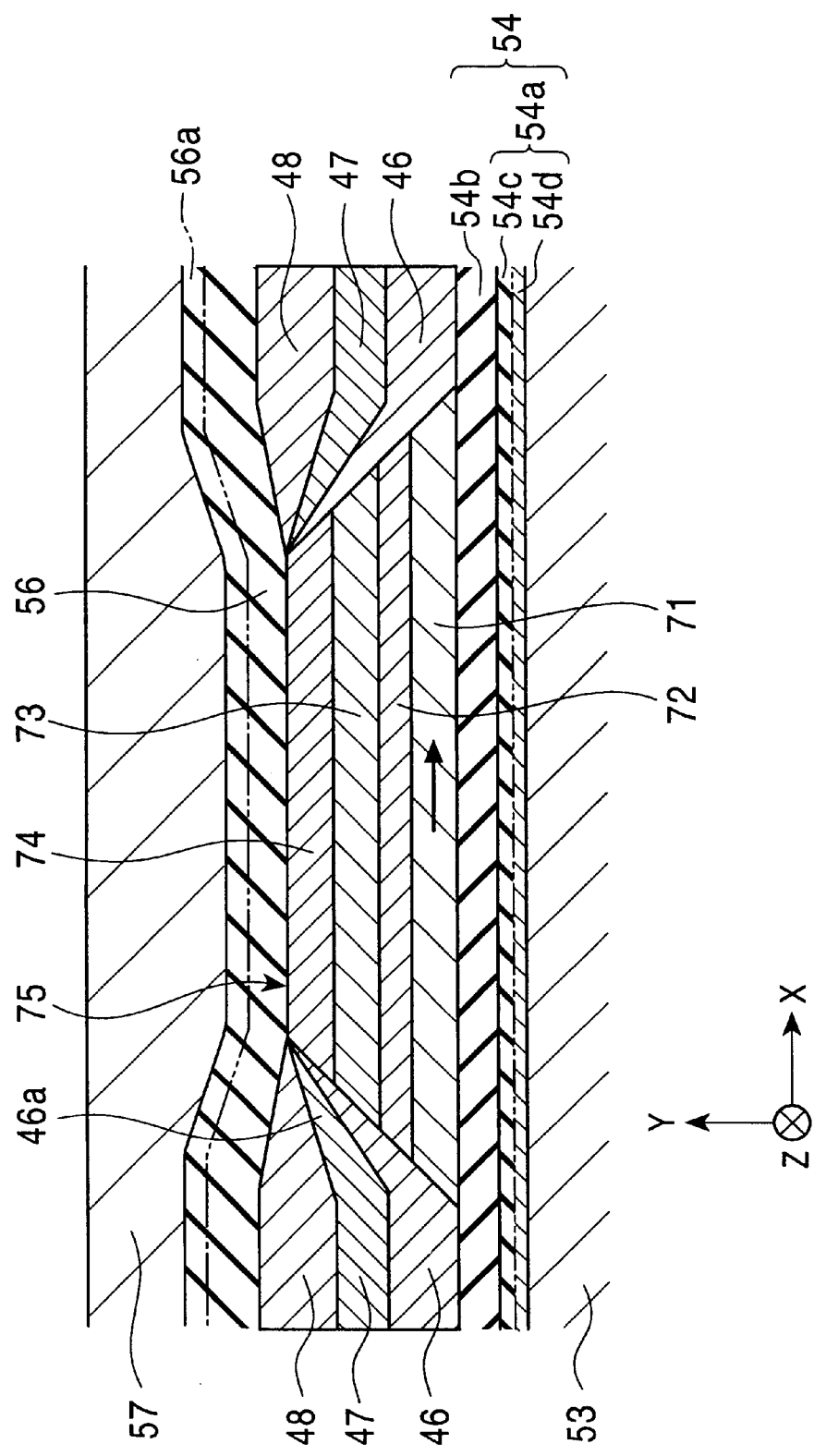
FIG. 5 is a sectional view showing the structure of a MR head provided in a thin-film magnetic head in accordance with a second embodiment of the present invention.

The magnetic head in the second embodiment differs from the magnetic head of the first embodiment in that an AMR element 75 is used as the magnetoresistive element in the MR head h1 as shown in FIG. 5.

In the AMR element 75, a nonmagnetic layer 72 composed of Ta or the like is formed on a soft magnetic layer 71 composed of a Ni—Fe—Nb alloy or the like, a ferromagnetic layer (AMR material layer) 73 composed of a Ni—Fe alloy or the like is formed on the nonmagnetic layer 72, and a protective layer 74 is further formed.

In order to optimally operate the MR head provided with the AMR element 75, two bias magnetic fields, i.e., a lateral bias and a longitudinal bias must be applied to the ferromagnetic layer 73 which exhibits an AMR effect.

The lateral bias magnetic field is used to make a change in the resistance of the ferromagnetic layer 73 linearly responsive to a magnetic flux from a magnetic medium. The lateral bias magnetic field is applied perpendicular to the surface of the magnetic medium (in the Z direction in FIG. 5) and parallel to the plane of the ferromagnetic layer 73. The lateral bias magnetic field can be produced by applying a sensing current through electrode layers 48 to the AMR element 75.

The longitudinal bias magnetic field is applied so that Barkhausen noise, which is caused due to many domains formed in the ferromagnetic layer 73, is suppressed, namely, a smooth change in resistance with decreased noise is enabled in response to the magnetic flux from the magnetic medium. The longitudinal magnetic field is applied parallel to the magnetic medium and the plane of the ferromagnetic layer 73 (in the X direction in FIG. 5). The longitudinal bias magnetic field can be applied using a leakage magnetic flux from ferromagnetic layers 46 disposed at both sides of the ferromagnetic layer 73, and thereby the ferromagnetic layer 73 is aligned in a single-domain state and Barkhausen noise is suppressed.

In the magnetic head of the second embodiment, a crystallization-inhibiting film 54a is formed on the surface of a lower shielding layer 53 facing the AMR element 75, and the surface of the lower shielding layer 53 facing the AMR element 75 is covered by the crystallization-inhibiting film 54a, and thus, the similar operational advantages to those in the magnetic head of the first embodiment are obtainable.

Although the magnetic head in which the GMR element 45 or the AMR element 75 is used as the magnetoresistive element is described in the above embodiments, the structure of the magnetoresistive element is not limited thereto, and other structures may be employed.

EXAMPLES

Experiment 1

After the pressure of a thin-film deposition chamber of a DC magnetron sputtering system was reduced to $5.0 \times 10^{-7}$ Torr or less, Ar was introduced into the chamber and the pressure was set at $2 \times 10^{-3}$ Torr. A substrate in which an $Al_2O_3$ film was formed on the surface of an $Al_2O_3$—TiC plate was prepared, and using a target composed of Co—Zr—Nb, an amorphous film composed of $Co_{87}Zr_4Nb_9$ (hereinafter referred to as a "CoZrNb film") as a lower shielding layer was deposited at a thickness of 1 μm ($10^4$ angstroms) on the substrate by sputtering at a sputtering power of 4,000 W. In this way, a base for forming samples was obtained.

Next, Samples 1 to 7 were formed by performing various types of treatment to the lower shielding layer of the base as described in (1) to (7) below.

(1) As Sample 1 (comparative example 1), the CoZrNb film immediately after deposition (within 2 hours) was used.

(2) In Sample 2 (comparative example 2), after the CoZrNb film was deposited on the substrate, annealing was performed for 1 hour in a vacuum at 350° C.

(3) In Sample 3 (comparative example 3), after the CoZrNb film was deposited on the substrate, annealing was performed for 1 hour in a vacuum at 450° C.

(4) In Sample 4 (example 1), after the CoZrNb film was deposited on the substrate, an $Al_2O_3$ film was continuously deposited at a thickness of 100 angstroms. In order to form the $Al_2O_3$ film, an Al—O-based target was set in a high-frequency magnetron sputtering system, and after the pressure of a thin-film deposition chamber of the system was reduced to $8.0 \times 10^{-7}$ Torr or less, Ar was introduced into the chamber and the pressure was set at $3 \times 10^{-3}$ Torr. At a sputtering power of 3,000 W, the $Al_2O_3$ film was deposited on the surface of the base by sputtering.

(5) In Sample 5 (example 2), after the CoZrNb film was deposited on the substrate, an $Al_2O_3$ film was continuously deposited at a thickness of 100 angstroms in a manner similar to that in example 1, and then annealing was performed for 1 hour in a vacuum at 350° C.

(6) In Sample 6 (example 3), after the CoZrNb film was deposited on the substrate, a Ta film was continuously deposited at a thickness of 30 angstroms. In order to form the Ta film, a Ta target was set in a DC magnetron sputtering system, and after the pressure of a thin-film deposition chamber of the system was reduced to $5.0 \times 10^{-7}$ Torr or less, Ar was introduced into the chamber and the pressure was set at $4 \times 10^{-3}$ Torr. At a sputtering power of 100 W, the Ta film was deposited.

(7) In Sample 7 (example 4), after the CoZrNb film was deposited on the substrate, a Ta film was continuously deposited at a thickness of 30 angstroms in a manner similar to that in example 3, and then annealing was performed for 1 hour in a vacuum at 350° C.

Figure 6:
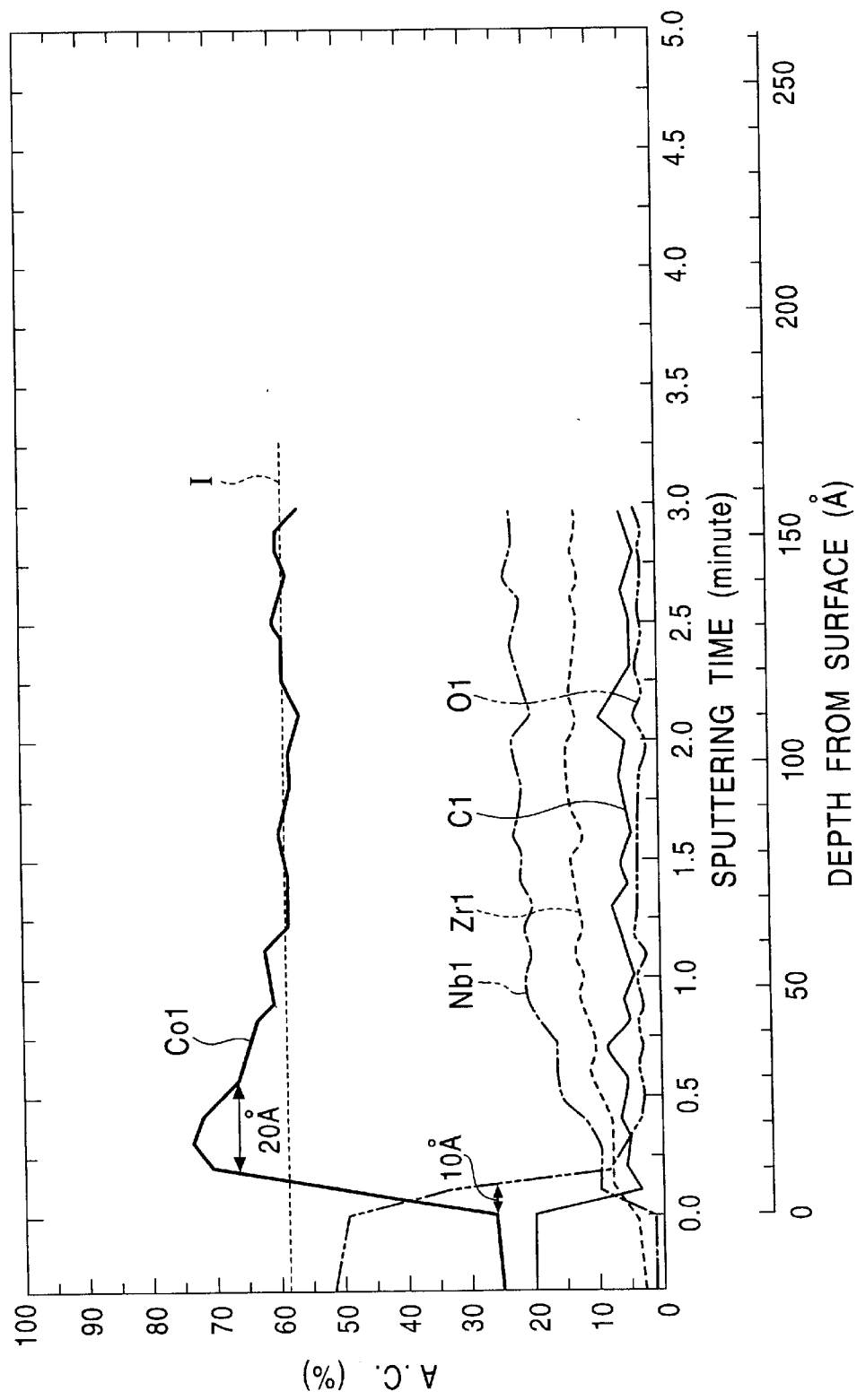
FIG. 6 is a depth profile showing the results obtained by Auger spectroscopy with respect to the composition in the depth direction of Sample 1 (comparative example 1)
Figure 7:
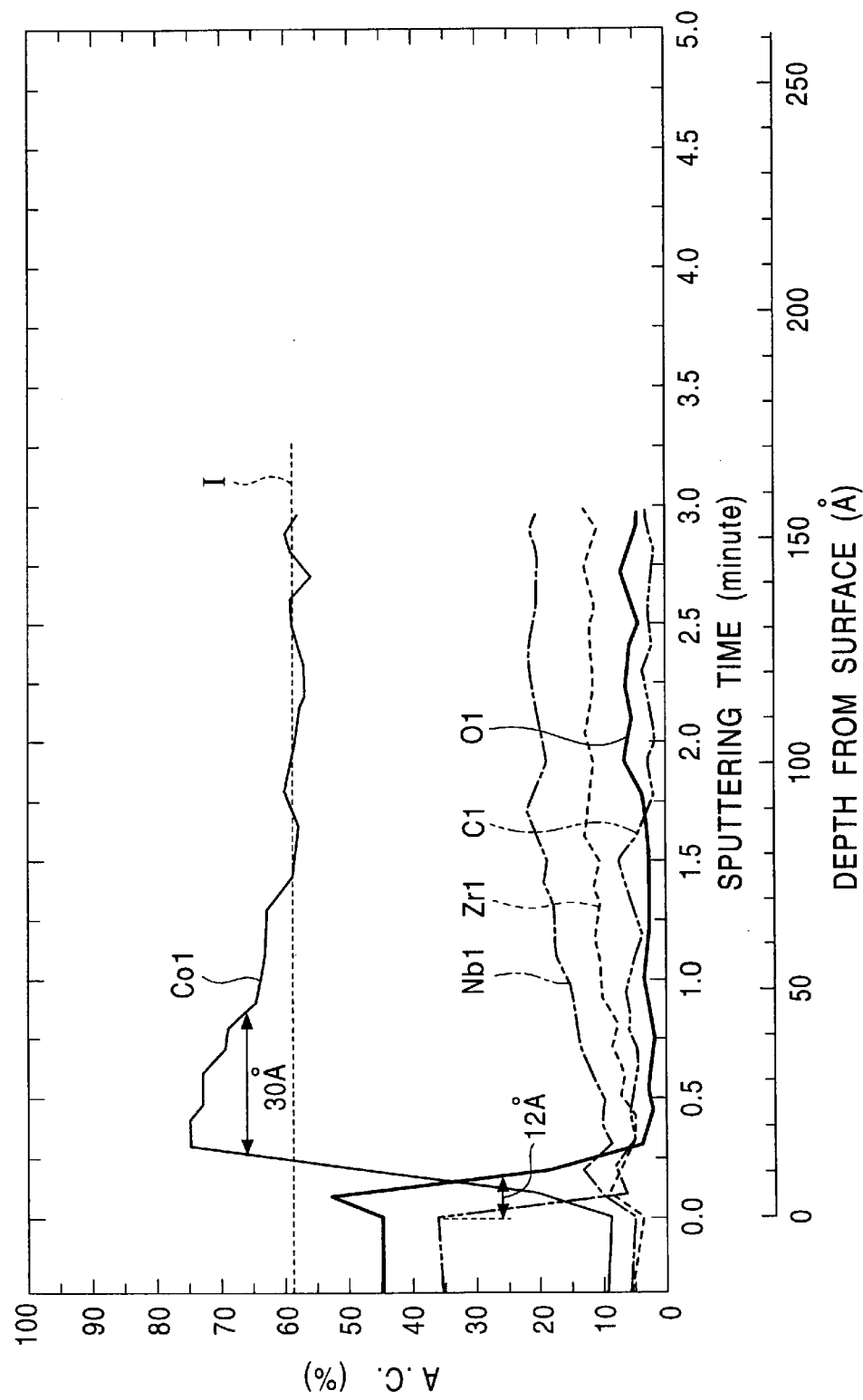
FIG. 7 is a depth profile showing the results obtained by Auger spectroscopy with respect to the composition in the depth direction of Sample 2 (comparative example 2)
Figure 8:
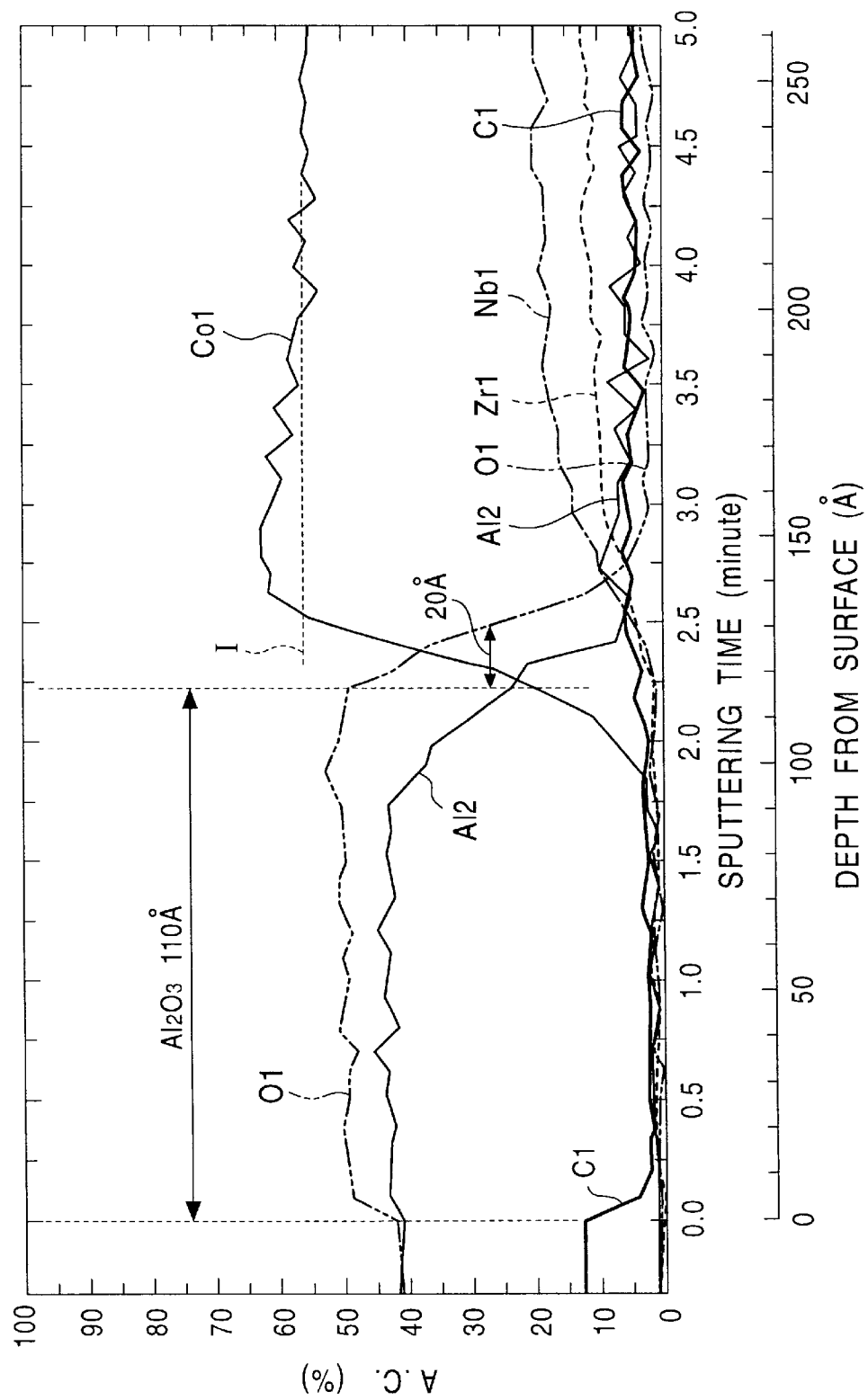
FIG. 8 is a depth profile showing the results obtained by Auger spectroscopy with respect to the composition in the depth direction of Sample 5 (example 2)
Figure 9:
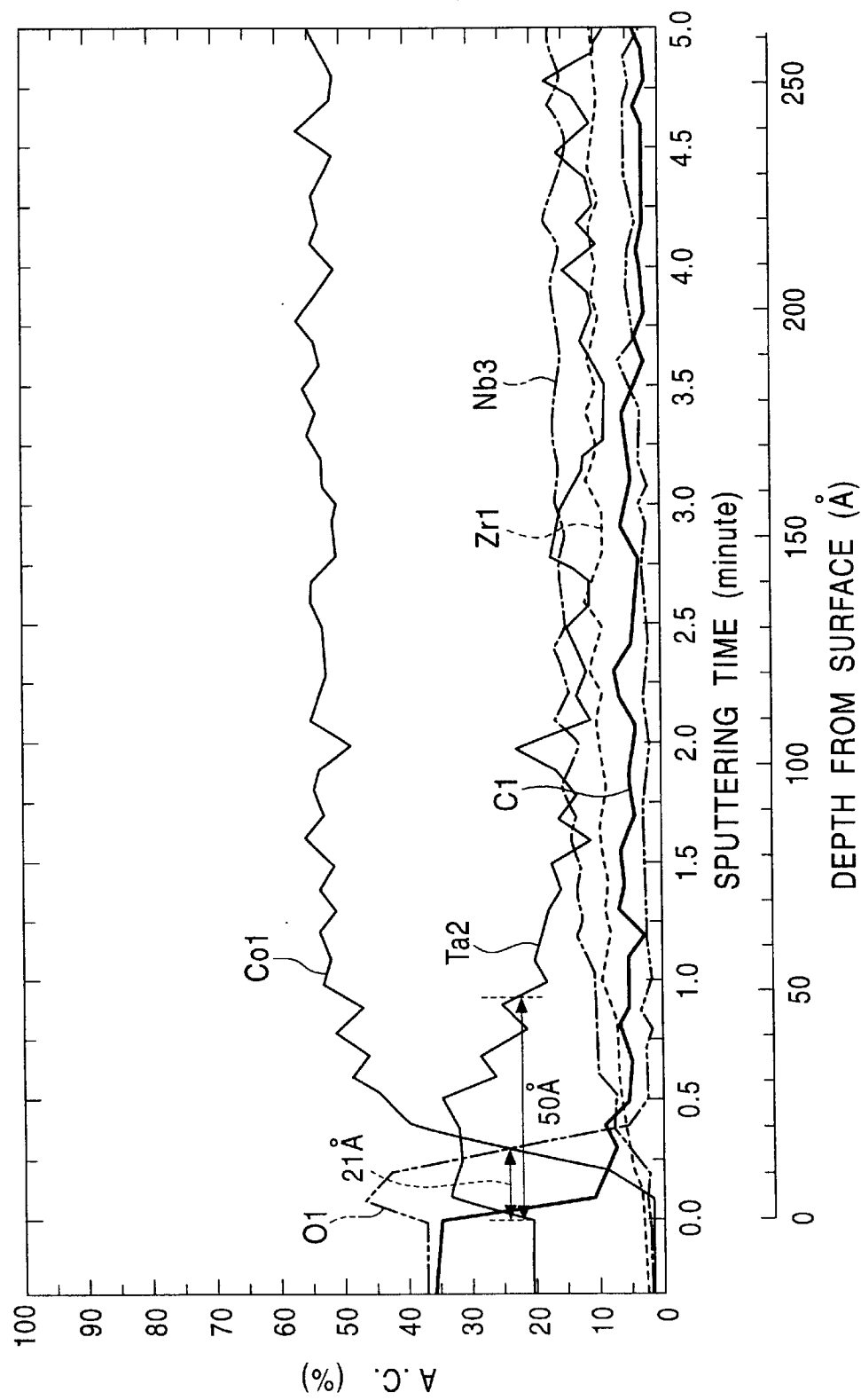
FIG. 9 is a depth profile showing the results obtained by Auger spectroscopy with respect to the composition in the depth direction of Sample 7 (example 4)

The compositions in the depth direction (thickness direction) of Samples 1 to 7 were investigated by Auger electron spectroscopy (AES), and the results thereof are shown in FIGS. 6 to 9. FIG. 6 is a depth profile of Sample 1 (comparative example 1), FIG. 7 is a depth profile of Sample 2 (comparative example 2), FIG. 8 is a depth profile of Sample 5 (example 2), and FIG. 9 is a depth profile of Sample 7 (example 4). Although depth profiles of Sample 3 (comparative example 3), Sample 4 (example 1), and Sample 6 (example 3) are not shown in the drawing, the depth profile of Sample 3 (comparative example 3) was substantially the same as that of Sample 2 (comparative example 2), the depth profile of Sample 4 (example 1) was substantially the same as that of Sample 5 (example 2), and the depth profile of Sample 6 (example 3) was substantially the same as that of Sample 7 (example 4).

As is clear from the results shown in FIG. 6, in Sample 1 (comparative example 1), since the oxygen content was increased from the surface of the lower shielding layer up to a depth of 10 angstroms, an oxide layer containing Nb and Zr was formed.

The Co content in the depth range of 10 to 30 angstroms was increased by approximately 15% in relation to the stable composition of 87% indicated by a broken line I, and a high Co-concentration layer with a thickness of approximately 20 angstroms was formed under the oxide layer. The contents of Nb and Zr were decreased in the high Co-concentration layer. It is believed that the high Co-concentration layer was formed in the vicinity of the surface of Sample 1 because Co was drawn toward oxygen.

As is clear from the results shown in FIG. 7, in Sample 2 (comparative example 2), even if annealing was performed at 350° C., although the oxide layer had a thickness of approximately 12 angstroms, the thickness of the high Co-concentration layer was slightly increased to approximately 30 angstroms.

As is clear from the results shown in FIG. 8, in Sample 5 (example 2), when the $Al_2O_3$ film was continuously deposited after the deposition of the CoZrNb film, since oxygen was contained from the surface of the sample up to a depth of 110 to 130 angstroms, an oxide layer was formed on the lower shielding layer. However, in a high Co-concentration layer below the oxide layer, the increasing rate of the Co concentration is lower in comparison with Sample 1. Since the results of Sample 4 (example 1) were substantially the same as those of Sample 5, when the $Al_2O_3$ film was continuously deposited after the deposition of the CoZrNb film, the diffusion of O in the $Al_2O_3$ film was not increased by the subsequent annealing.

As is clear from the results shown in FIG. 9, in Sample 7 (example 4) in which the Ta film was formed on the lower shielding layer, the oxygen content was increased from the surface up to a depth of 21 angstroms, and the Ta content was increased from just beneath the outermost surface to a depth of 21 angstroms, and thus an oxide layer of Ta with a thickness of approximately 19 angstroms was formed. The Ta content in the depth range of 21 to 40 angstroms was increased and the oxygen content in this range was very low, and thus a Ta layer with a thickness of approximately 20 angstroms was formed. Although Ta was slightly diffused into the lower shielding layer, magnetic properties of the outermost surface of the lower shielding layer were not greatly affected.

In Sample 7, the contents of Co, Nb, and Zr in the layer beneath the Ta layer were stabilized, and oxygen was not greatly contained therein. Thus, an oxide layer containing Nb and Zr or a high Co-concentration layer was not formed.

Since the results of Sample 6 (example 3) were substantially the same as those of Sample 7, when the Ta film was deposited on the CoZrNb film, the oxide layer of Ta was not increased by the subsequent annealing and also the diffusion of Ta into the lower shielding layer was not increased.

The structures of the lower shielding layers in Samples 1 to 7 were investigated using an X-ray reflectance measuring apparatus. The results thereof are described below.

In Sample 1 (comparative example 1), even immediately after the deposition of the CoZrNb film (within 2 hours), a low-density layer with a thickness of approximately 21 angstroms was found in the lower shielding layer, and thus the formation of an oxide layer was confirmed.

In Sample 2 (comparative example 2), because of annealing, the thickness of the outermost oxide layer was increased in comparison with Sample 1, and the low-density layer had a thickness of approximately 30 angstroms.

In Sample 3 (comparative example 3), although the crystallization was assumed, the thickness of the oxide layer and the surface roughness were substantially the same as in Sample 2.

In Sample 4 (example 1), the thickness of a layer reacting with $Al_2O_3$ was as small as approximately 4 angstroms.

In Sample 5 (example 2), because of annealing, the thickness of the layer reacting with $Al_2O_3$ was approximately 6.5 angstroms, which was substantially the same as that in Sample 4.

In Sample 6 (example 3), an oxide layer of Ta with a thickness of approximately 19 angstroms was formed on the outermost surface, and a Ta layer with a thickness of approximately 20 angstroms was formed therebelow. The penetration of Ta into the lower shielding layer was as small as 14 angstroms.

In Sample 7 (example 4), an oxide layer of Ta with a thickness of approximately 20 angstroms was formed on the outermost surface, and a Ta layer with a thickness of approximately 17 angstroms was formed therebelow. Although annealing was performed, the penetration of Ta into the lower shielding layer was not increased, and was approximately 7 angstroms.

Next, the surface roughness (Ra) was investigated using an atomic force microscope (AFM) with respect to Sample 1 (comparative example 1), Sample 3 (comparative example 3), Sample 5 (example 2), Sample 6 (example 3), and Sample 7 (example 4).

In Sample 1 (comparative example 1), the lower shielding layer immediately after the deposition had a surface roughness of 0.15 to 0.2 nm. In Sample 3 (comparative example 3), the lower shielding layer had a surface roughness of 0.17 to 0.34 nm, which was slightly larger than that of Sample 1 due to annealing.

In contrast, the $Al_2O_3$ film of Sample 5 (example 2) had a surface roughness of approximately 0.15 nm, which was smaller than that of Sample 3 (comparative example 3).

In Sample 6 (example 3), the crystallization-inhibiting film had a surface roughness of 0.17 to 0.25 nm, and in Sample 7 (example 4), the crystallization-inhibiting film had a surface roughness of 0.17 to 0.25 nm, both of which were smaller than that of Sample 5 (example 2) in which the $Al_2O_3$ film was continuously deposited after the deposition of the lower shielding layer.

Therefore, in example 2 in which the $Al_2O_3$ film was continuously deposited after the deposition of the amorphous film comprising $Co_{87}Zr_4Nb_9$, the effect of reducing an increase in the surface roughness of the sample was exhibited. In particular, in examples 3 and 4 in which the surface of the amorphous film comprising $Co_{87}Zr_4Nb_9$ was covered by the Ta film, the superior effect of reducing the increase in the surface roughness was exhibited. If a MR element is formed on such a planar Ta film with an insulating layer therebetween, the unevenness of the surface of the MR element will be improved.

Figure 10:
FIG. 10 is a photograph of an electron diffraction pattern showing the structure of a lower shielding layer of Sample 3 (comparative example 3)
Figure 11:
FIG. 11 is a photograph of an electron diffraction pattern showing the structure of a lower shielding layer of Sample 7 (example 4)

Next, the structure of the lower shielding layer was investigated by electron diffraction (ED) analysis with respect to Sample 3 (comparative example 3) and Sample 7 (example 4). The results thereof are shown in FIGS. 10 and 11. FIG. 10 is a photograph of an electron diffraction pattern showing the structure of a lower shielding layer of Sample 3 (comparative example 3). FIG. 11 is a photograph of an electron diffraction pattern showing the structure of a lower shielding layer of Sample 7 (example 4).

As is clear from the electron diffraction patterns shown in FIGS. 10 and 11, in the lower shielding layer of Sample 3 (comparative example 3), spot patterns were observed, which confirmed the precipitation of crystals. In the lower shielding layer of Sample 7 (example 4) in which the Ta film as the crystallization-inhibiting film was deposited on the lower shielding layer, even if Ta was slightly diffused, the structure was amorphous, and crystals were not precipitated. Therefore, in examples 3 to 4, since crystals were not precipitated in the lower shielding layers, deterioration of magnetic properties of the outermost layers resulting from the precipitation of crystals could be avoided. By forming a MR element on such a Ta film with an insulating layer therebetween, the regenerated waveforms and the waveform symmetry of the thin-film magnetic head can be stabilized.

Experiment 2

In a manner similar to that in experiment 1, Sample 2 (comparative example 2) and Samples 4 to 7 (Examples 1 to 4) were prepared, and the above samples were subjected to various types of treatment to form Samples 8 to 11 as described below.

(8) In Sample 8 (comparative example 4), an $Al_2O_3$ film as an insulating layer with a thickness of 700 angstroms was deposited on the surface of the Sample 2 (comparative example 2). In order to form the $Al_2O_3$ film, an Al-O-based target was set in a high-frequency magnetron sputtering system, and after the pressure of a thin-film deposition chamber of the system was reduced to $8.0 \times 10^{-7}$ Torr or less, Ar was introduced into the chamber and the pressure was set at $3 \times 10^{-3}$ Torr. At a sputtering power of 3,000 W, the $Al_2O_3$ film was deposited by sputtering.

(9) In Sample 9 (comparative example 5), after an $Al_2O_3$ film with a thickness of 700 angstroms was deposited on the surface of Sample 2 (Comparative example 2) in a manner similar to that in Sample 8, annealing was performed for 4 hours in a vacuum at 270° C.

(10) In Sample 10 (example 5), an $Al_2O_3$ film with a thickness of 700 angstroms was deposited on the surface of Sample 4 (example 1) in a manner similar to that in Sample 8.

(11) In Sample 11 (example 6), an $Al_2O_3$ film with a thickness of 700 angstroms was deposited on the surface of Sample 5 (example 2) in a manner similar to that in Sample 8.

(12) In Sample 12 (example 7), an $Al_2O_3$ film with a thickness of 700 angstroms was deposited on the surface of Sample 6 (example 3) in a manner similar to that in Sample 8.

(13) In Sample 13 (example 8), an $Al_2O_3$ film with a thickness of 700 angstroms was deposited on the surface of Sample 7 (example 4) in a manner similar to that in Sample 8.

(14) In Sample 14 (example 9), after an $Al_2O_3$ film with a thickness of 700 angstroms was deposited on the surface of Sample 7 (example 4) in a manner similar to that in Sample 8, annealing was performed in a vacuum at 270° C. for 4 hours in a manner similar to that in Sample 9.

Figure 12:
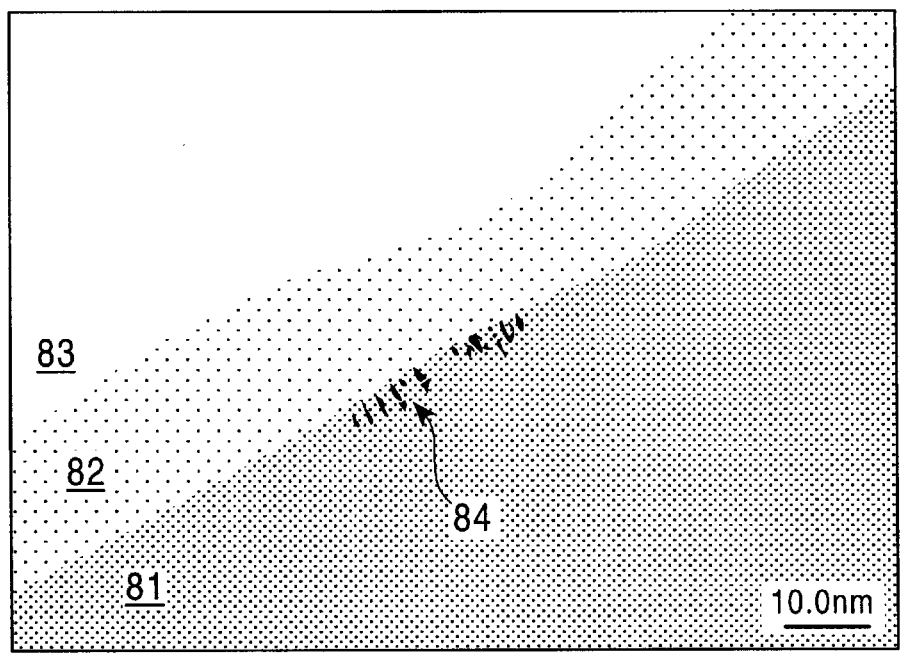
FIG. 12 is a schematic diagram based on a TEM micrograph showing the structure of Sample 8 (comparative example 4)
Figure 13:
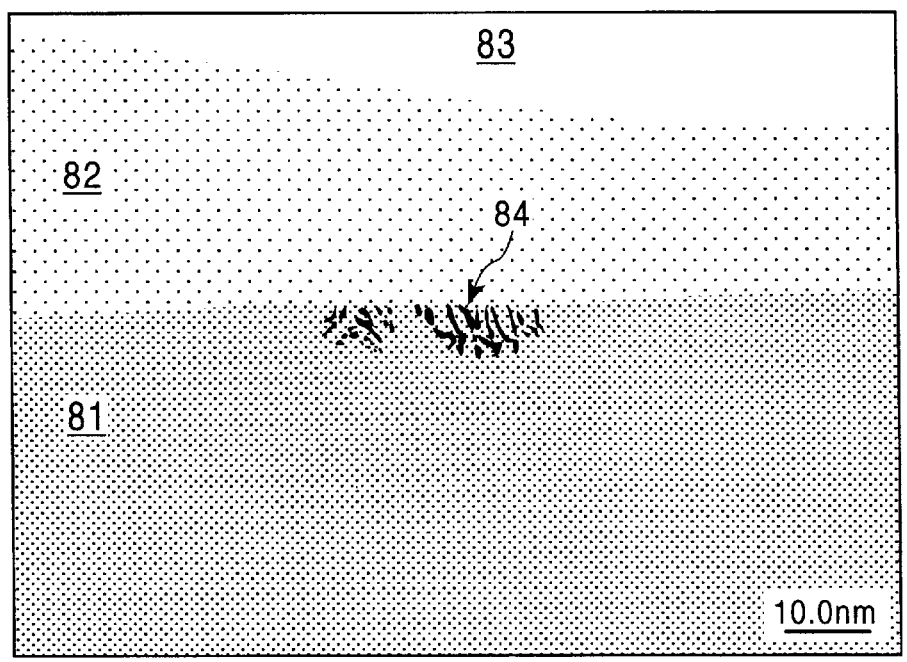
FIG. 13 is a schematic diagram based on a TEM micrograph showing the structure of Sample 9 (comparative example 5)
Figure 14:
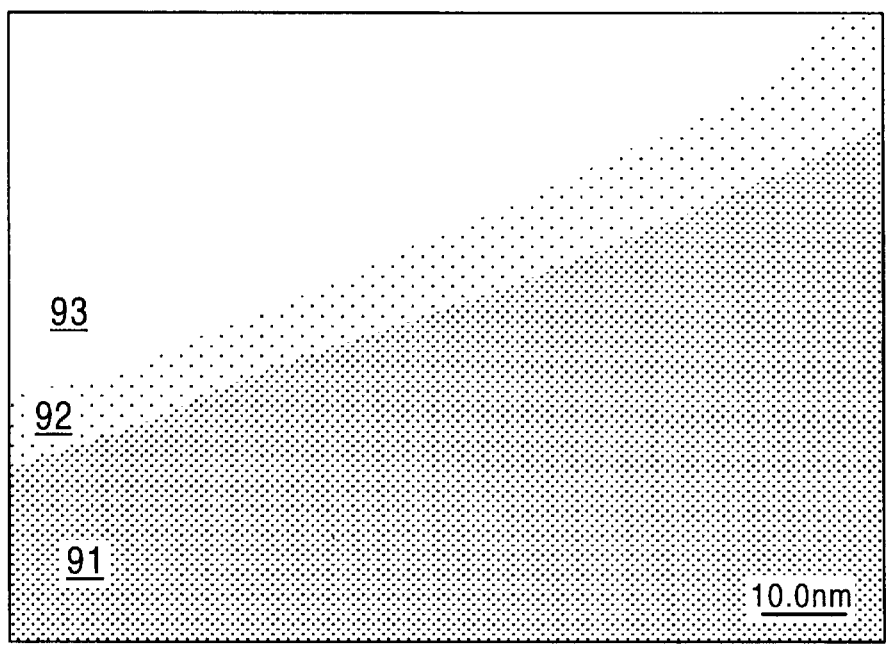
FIG. 14 is a schematic diagram based on a TEM micrograph showing the structure of Sample 10 (example 5)
Figure 15:
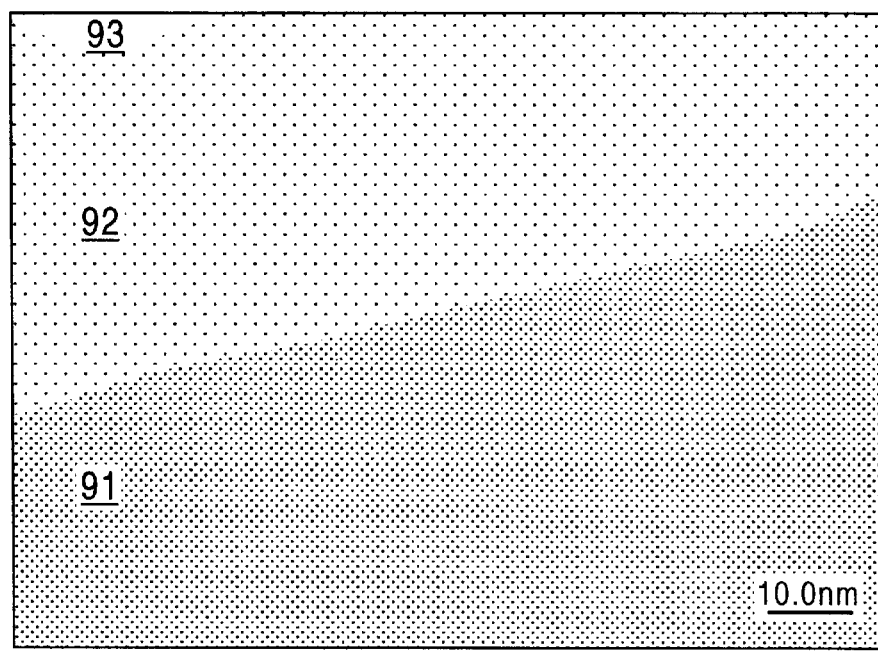
FIG. 15 is a schematic diagram based on a TEM micrograph showing the structure of Sample 11 (example 6)
Figure 16:
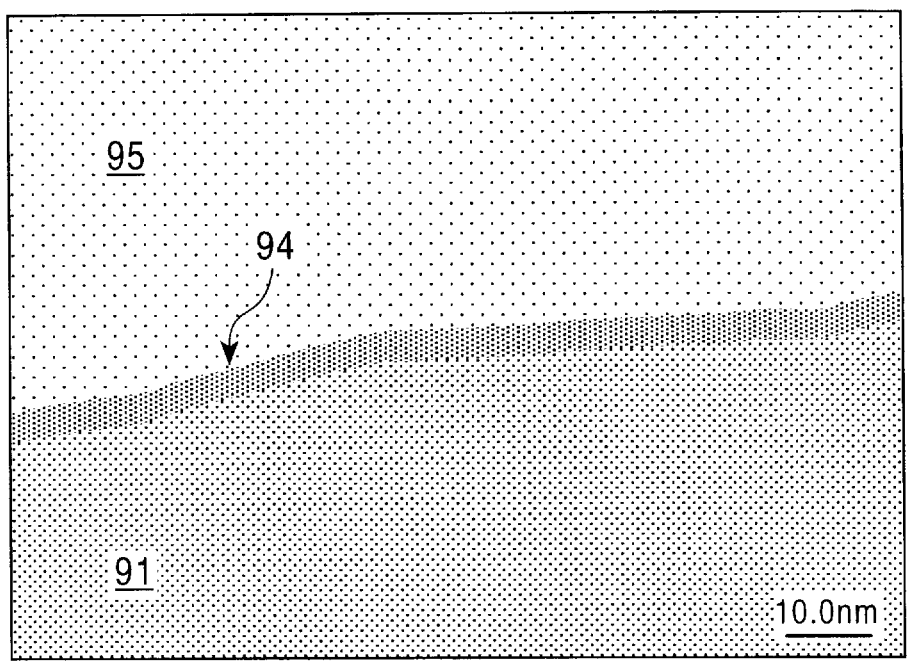
FIG. 16 is a schematic diagram based on a TEM micrograph showing the structure of Sample 12 (example 7)
Figure 17:
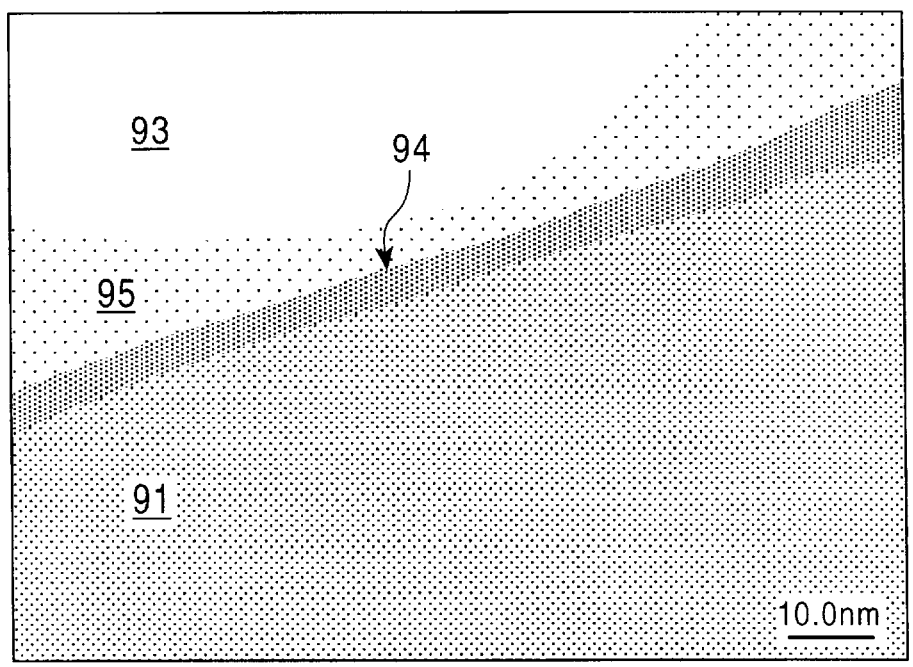
FIG. 17 is a schematic diagram based on a TEM micrograph showing the structure of Sample 13 (example 8)
Figure 18:
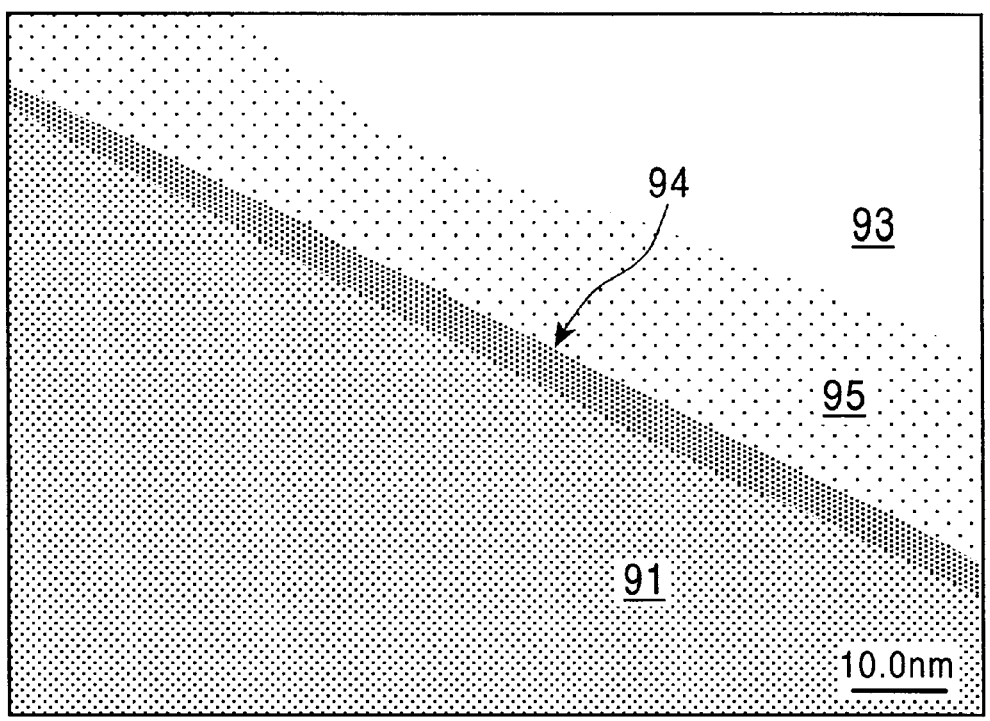
FIG. 18 is a schematic diagram based on a TEM micrograph showing the structure of Sample 14 (example 9)
Figure 19:
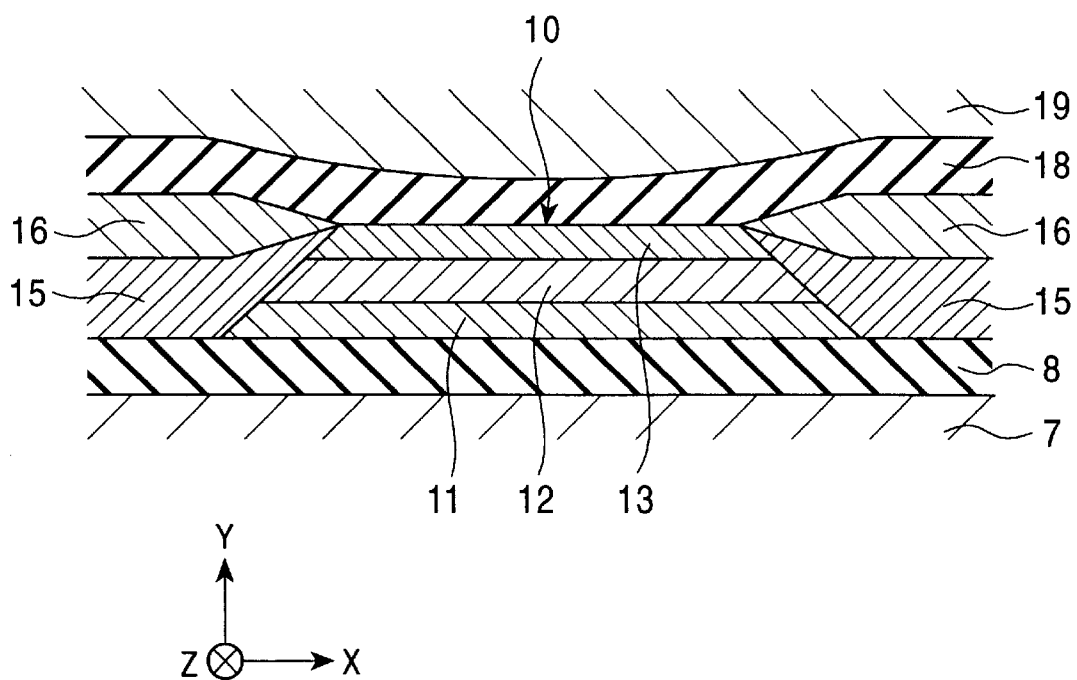
FIG. 19 is a sectional view showing the structure of a conventional AMR head.
Figure 20:
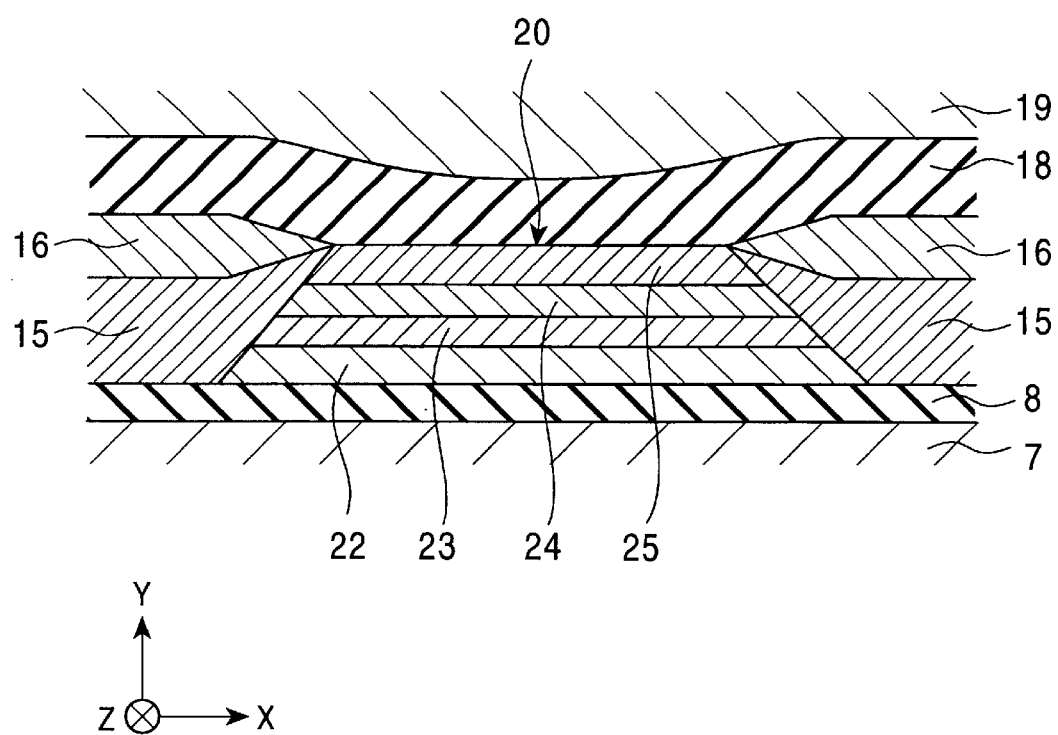
FIG. 20 is a sectional view showing the structure of a conventional GMR head.

The structures of Samples 8 to 14 were investigated by a high-resolution transmission electron microscope (TEM), and the results thereof are shown in FIGS. 12 to 18. FIG. 12 is a schematic diagram based on a TEM micrograph showing the structure of Sample 8 (comparative example 4). FIG. 13 is a schematic diagram based on a TEM micrograph showing the structure of Sample 9 (comparative example 5). FIG. 14 is a schematic diagram based on a TEM micrograph showing the structure of Sample 10 (example 5). FIG. 15 is a schematic diagram based on a TEM micrograph showing the structure of Sample 11 (example 6). FIG. 16 is a schematic diagram based on a TEM micrograph showing the structure of Sample 12 (example 7). FIG. 17 is a schematic diagram based on a TEM micrograph showing the structure of Sample 13 (example 8). FIG. 18 is a schematic diagram based on a TEM micrograph showing the structure of Sample 14 (example 9).

Layers 83 in FIGS. 12 and 13 and Layers 93 in FIGS. 14, 15, 17, and 18 are fixing materials used for taking TEM micrographs.

As is clear from the results shown in FIG. 12, in Sample 8 (comparative example 4), crystals (represented by numeral 84) were precipitated in the vicinity of the outermost surface of the lower shielding layer 81 composed of CoZrNb. A layer 82 in the drawing is the $Al_2O_3$ film as the insulating layer.

As is clear from the results shown in FIG. 15, in Sample 11 (example 6), the precipitation of crystals was not observed in the amorphous film comprising $Co_{87}Zr_4Nb_9$ (a layer represented by numeral 91 in the drawing). A layer 92 is the $Al_2O_3$ film.

As is clear from the results shown in FIG. 17, in Sample 13 (example 8), a Ta film (a layer represented by numeral 94) was formed on the amorphous film comprising $Co_{87}Zr_4Nb_9$ (a layer represented by numeral 91 in the drawing) of the lower shielding layer, and the precipitation of crystals was not observed in the amorphous film comprising $Co_{87}Zr_4Nb_9$. A layer 95 is the $Al_2O_3$ film.

In example 6, since the $Al_2O_3$ film was continuously formed after the deposition of the amorphous film comprising $Co_{87}Zr_4Nb_9$, even if the insulating layer was formed after annealing, the precipitation of crystals in the vicinity of the outermost layer of the lower shielding layer was avoided. In particular, in example 8, since the surface of the amorphous film comprising $Co_{87}Zr_4Nb_9$ was covered by the Ta film, even if the insulating layer was formed after annealing, the formation of an oxide layer containing the ingredients of the lower shielding layer and the precipitation of crystals in the vicinity of the outermost surface of the lower shielding layer were avoided.

As is clear from the results shown in FIG. 14, in Sample 10 (example 5), the precipitation of crystals was not observed in the amorphous film comprising $Co_{87}Zr_4Nb_9$ (represented by numeral 91 in the drawing). A layer 92 is the $Al_2O_3$ film.

As is clear from the results shown in FIG. 16, in Sample 12 (example 7), the Ta film (represented by numeral 94 in the drawing) was formed on the amorphous film comprising $Co_{87}Zr_4Nb_9$ (represented by numeral 91 in the drawing) of the lower shielding layer, and the precipitation of crystals was not observe in the amorphous film comprising $Co_{87}Zr_4Nb_9$. A layer 95 is the $Al_2O_3$ film.

As described above, in example 5, since the $Al_2O_3$ film was formed continuously after the amorphous film comprising $Co_{87}Zr_4Nb_9$ was formed, even if the $Al_2O_3$ film as the insulating layer was formed, the precipitation of crystals in the vicinity of the outermost surface of the lower shielding layer was avoided. In particular, in example 7, since the surface of the amorphous film comprising $Co_{87}Zr_4Nb_9$ was covered by the Ta film, even if the $Al_2O_3$ film as the insulating layer was formed, the formation of an oxide layer containing the ingredients of the lower shielding layer and the precipitation of crystals in the vicinity of the outermost surface of the lower shielding layer were avoided.

As is clear from the results shown in FIG. 13, in Sample 9 (comparative example 5), crystals (represented by numeral 84) were precipitated in the vicinity of the outermost surface of the lower shielding layer composed of CoZrNb. A layer 82 in the drawing is the $Al_2O_3$ film as the insulating layer.

As is clear from the results shown in FIG. 18, in Sample 14 (example 9), the Ta film (represented by numeral 94 in the drawing) was formed on the amorphous film comprising $Co_{87}Zr_4Nb_9$ (represented by numeral 91 in the drawing) of the lower shielding layer, and the precipitation of crystals was not observe in the amorphous film comprising $Co_{87}Zr_4Nb_9$. A layer 95 is the $Al_2O_3$ film.

As described above, in example 9, since the surface of the amorphous film comprising $Co_{87}Zr_4Nb_9$ was covered by the Ta film, even if the $Al_2O_3$ film as the insulating layer was formed, followed by annealing, the formation of an oxide layer containing the ingredients of the lower shielding layer and the precipitation of crystals in the vicinity of the outermost surface of the lower shielding layer were avoided.

Next, the surface roughness (Ra) of the $Al_2O_3$ film at the outermost surface was investigated using an atomic force microscope (AFM) with respect to Sample 8 (comparative example 4), Sample 11 (example 6), and Sample 13 (example 8).

In Sample 8 (comparative example 4), the surface roughness was 0.17 to 0.34 nm. In contrast, in Sample 11 (example 6), the surface roughness was approximately 0.15 nm. Thus, it is obvious that by forming the $Al_2O_3$ film as the crystallization-inhibiting film on the amorphous film comprising $Co_{87}Zr_4Nb_9$, even if the $Al_2O_3$ film as the insulating layer was formed after annealing, the surface roughness was decreased in comparison with Sample 8.

In Sample 13 (example 8), the surface roughness was 0.15 to 0.21 nm. Thus, it is obvious that by forming the Ta film as the crystallization-inhibiting film on the amorphous film comprising $Co_{87}Zr_4Nb_9$, even if the $Al_2O_3$ film as the insulating layer was formed after annealing, the surface roughness was decreased in comparison with Sample 8 (comparative example 4).

Therefore, in example 6 in which the $Al_2O_3$ film was continuously deposited after the deposition of the amorphous film comprising $Co_{87}Zr_4Nb_9$, the effect of reducing an increase in the surface roughness of the insulating layer was exhibited. In particular, in example 8 in which the surface of the amorphous film comprising $Co_{87}Zr_4Nb_9$ was covered by the Ta film, the superior effect of reducing the increase in the surface roughness was exhibited. If a MR element is formed on such a planar insulating layer, the unevenness of the surface of the MR element will be improved.

As described above, in the thin-film magnetic head of the present invention, the insulating layer is disposed between the magnetoresistive element and the shielding layer, the shielding layer is composed of the amorphous material, and the surface of the shielding layer facing the magnetoresistive element is covered by the crystallization-inhibiting film for inhibiting crystallization of the shielding layer. Therefore, a crystallized layer is not formed on the surface of the shielding layer facing the magnetoresistive element, magnetic properties are prevented from deteriorating, and the effective gap length can be easily controlled.

What is claimed is:

1. A thin-film magnetic head comprising:

a magnetoresistive element;

a lower shielding layer disposed over a substrate; and a lower insulating layer disposed between the magnetoresistive element and the shielding layer, wherein the lower shielding layer comprises an amorphous material and a surface thereof facing the magnetoresistive element is covered by a crystallization-inhibiting film to inhibit crystallization of the shielding layer; and wherein the crystallization-inhibiting film comprises a high-melting point metal layer formed on the lower shielding layer side and an oxide layer formed on the lower insulating layer side, the high-melting point metal layer comprises at least one metal selected from the group consisting of Ta, W, and Hf, and the oxide layer comprises at least one oxide selected from the group consisting of $Al_2O_3$, $SiO_2$, and $Ta_2O_5$.

2. The thin-film magnetic head according to claim 1, wherein the crystallization-inhibiting film has an antioxidizing function for the shielding layer.

3. The thin-film magnetic head according to claim 1, wherein an upper insulating layer and an upper shielding layer are further disposed over the magnetoresistive element.

4. The thin-film magnetic head according to claim 1, wherein the high-melting point metal layer comprises Ta and the oxide layer comprises an oxide of Ta.

5. The thin-film magnetic head according to claim 1, wherein the crystallization-inhibiting film has a thickness of not less than 20 angstroms.

6. The thin-film magnetic head according to claim 1, wherein a thickness of the crystallization-inhibiting film is not greater than one tenth of that of the insulating layer.

7. The thin-film magnetic head according to claim 1, wherein a distance between the shielding layer and the magnetoresistive element is larger than a thickness corresponding to a thickness of the insulating layer plus 20 angstroms.

* * * * *

UNITED STATES PATENT AND TRADEMARK OFFICE
CERTIFICATE OF CORRECTION

PATENT NO. : 6,697,234 B2
DATED : February 24, 2004
INVENTOR(S) : Fumihito Koike It is certified that error appears in the above-identified patent and that said Letters Patent is hereby corrected as shown below:

Title page,
Item [56], References Cited, FOREIGN PATENT DOCUMENTS, insert
-- JP   9-91625      4/1997 --.

Column 20,
Line 51, insert -- lower -- before "shielding".
Line 55, insert -- lower -- before "shielding".

Signed and Sealed this

Thirteenth Day of July, 2004

JON W. DUDAS
*Acting Director of the United States Patent and Trademark Office*